United States Patent
Wang et al.

(10) Patent No.: US 12,470,999 B2
(45) Date of Patent: Nov. 11, 2025

(54) COMMUNICATION METHOD, DEVICE, AND SYSTEM

(71) Applicant: HUAWEI TECHNOLOGIES CO., LTD., Guangdong (CN)

(72) Inventors: Nanxin Wang, Shanghai (CN); Wenjie Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 17/854,674

(22) Filed: Jun. 30, 2022

(65) Prior Publication Data

US 2022/0338093 A1   Oct. 20, 2022

Related U.S. Application Data

(63) Continuation of application No. PCT/CN2019/130809, filed on Dec. 31, 2019.

(51) Int. Cl.
H04W 88/04 (2009.01)
H04W 8/00 (2009.01)
H04W 40/22 (2009.01)

(52) U.S. Cl.
CPC ........... *H04W 40/22* (2013.01); *H04W 8/005* (2013.01); *H04W 88/04* (2013.01)

(58) Field of Classification Search
CPC ......... H04W 4/40; H04W 72/40; H04W 4/46; H04W 92/18; H04W 48/16; H04W 88/04
See application file for complete search history.

(56) References Cited

U.S. PATENT DOCUMENTS

| | | | |
|---|---|---|---|
| 2015/0029866 A1 | 1/2015 | Liao et al. | |
| 2019/0021044 A1 | 1/2019 | Pang et al. | |
| 2020/0344708 A1* | 10/2020 | Liao | H04W 72/02 |
| 2021/0051653 A1* | 2/2021 | Park | H04W 8/22 |
| 2021/0258764 A1* | 8/2021 | Zhang | H04W 72/20 |

FOREIGN PATENT DOCUMENTS

| | | |
|---|---|---|
| CN | 106454992 A | 2/2017 |
| CN | 106454995 A | 2/2017 |
| CN | 106604341 A | 4/2017 |
| CN | 109314992 B | 5/2022 |

(Continued)

OTHER PUBLICATIONS

Sony, "Discussion on Discovery Enhancements For FeD2D", 3GPP TSG RAN WG1 Meeting #90, R1-1714056, Prague, Czechia, Aug. 21-25, 2017, 4 pages.

(Continued)

*Primary Examiner* — Tu X Nguyen
(74) *Attorney, Agent, or Firm* — Fish & Richardson P.C.

(57) ABSTRACT

Embodiments of this application provide example communication methods, apparatuses, and systems. One example method includes receiving, by a first terminal device, a first message from a second terminal device. The first message is determined to be a discovery message by the first terminal device based on a first resource for transmitting the first message, where the first resource is a resource specially used to transmit the discovery message, and the discovery message indicates that the second terminal device is a relay terminal device.

15 Claims, 7 Drawing Sheets

(56) References Cited

FOREIGN PATENT DOCUMENTS

| WO | 2017051859 A1 | 3/2017 |
|---|---|---|
| WO | 2018028254 A1 | 2/2018 |
| WO | 2018129543 A1 | 7/2018 |
| WO | 2019136626 A1 | 7/2019 |

OTHER PUBLICATIONS

ITRI, "Solution For Non-3GPP Access Discovery," SA WG2 Meeting #119, S2-171177, Feb. 13-17, 2017, Dubrovnik, Croatia, 3 pages.
Extended European Search Report in European Appln No. 19958502.7, dated Oct. 19, 2022, 8 pages.
Oppo, "New SID: Study on NR sidelink relaying," 3GPP TSG RAN Meeting #86, RP-192752, Sitges, Spain, Dec. 9-12, 2019, 5 pages.
3GPP TS 38.321 V15.7.0, "3rd Generation Partnership Project; Technical Specification Group Radio Access Network; NR; Medium Access Control (MAC) protocol specification (Release 15)," Sep. 2019, 78 pages.
3GPP TS 38.300 V15.7.0, "3rd Generation Partnership Project; Technical Specification Group Radio Access Network; NR; NR and NG-RAN Overall Description; Stage 2 (Release 15)," Sep. 2019, 99 pages.
3GPP TS 38.331 V15.7.0, "3rd Generation Partnership Project; Technical Specification Group Radio Access Network; NR; Radio Resource Control (RRC) protocol specification (Release 15)," Sep. 2019, 527 pages.
3GPP TS 23.287 V16.1.0 (Dec. 2019), "3rd Generation Partnership Project; Technical Specification Group Services and System Aspects; Architecture enhancements for 5G System (5GS) to support Vehicle-to-Everything (V2X) services (Release 16)," Dec. 2019, 51 pages.
3GPP TS 23.303 V15.1.0 (Jun. 2018), "3rd Generation Partnership Project; Technical Specification Group Services and System Aspects; Proximity-based services (ProSe); Stage 2 (Release 15)," Jun. 2018, 130 pages.
PCT International Search Report and Written Opinion issued in International Application No. PCT/CN2019/130809 on Sep. 25, 2020, 18 pages (with English translation).
Qualcomm Incorporated et al., "Solution for ProSe 5G Direct Discovery using PC5-U," SA WG2 Meeting #136, S2-1912709, Reno, USA, Nov. 18-22, 2019, 6 pages.
LG Electronics et al., "Summary of email discussion on sidelink enhancements in Rel-17," 3GPP#85, RP-191725, Newport Beach, USA, Sep. 16-20, 2019, 82 pages.

* cited by examiner

COMMUNICATION METHOD, DEVICE, AND SYSTEM

CROSS-REFERENCE TO RELATED APPLICATIONS

This application is a continuation of International Application No. PCT/CN2019/130809, filed on Dec. 31, 2019, the disclosure of which is hereby incorporated by reference in its entirety.

TECHNICAL FIELD

This application relates to the field of communication technologies, and in particular, to a communication method, a device, and a system.

BACKGROUND

To implement communication between remote user equipment (UE) and a base station, it is necessary to establish sidelink (SL) communication between the remote UE and relay UE. Before SL communication is implemented, relay discovery between the remote UE and the relay UE needs to be implemented first. As shown in FIG. 1, in 3rd generation partnership project (3GPP) release 15 (R15), a corresponding protocol stack is specially designed for the relay discovery on a PC-5 interface. Therefore, there are two protocol stacks, respectively used for the relay discovery and the SL communication, between the remote UE and the relay UE. PC5-D is used for the relay discovery, and a protocol stack on PC5-D includes a physical (PHY) layer, a media access control (MAC) layer, and a proximity-based services protocol (prose protocol) layer. PC5-U is used for the SL communication, and a protocol stack on PC5-U includes a PHY layer, a MAC layer, a radio link control (RLC) layer, a packet data convergence protocol (PDCP) layer, an internet protocol (IP) layer, and an application layer.

However, according to a definition in 3GPP technology standard (TS) 23.287, no dedicated PC5-D is to be used for the relay discovery in vehicle to everything (V2X). For backward compatibility, no dedicated PC5-D is designed for the relay discovery in R17. On this premise, how to implement the relay discovery by using existing PC5-U needs to be further discussed.

Currently, it is proposed in a solution that when the relay discovery is implemented by using existing PC5-U, a related discovery message may be indicated by adding an identifier to an L2 frame (namely, a data frame at a MAC layer). However, generally, a relay selection (relay (re)selection) process is performed immediately after the relay discovery is completed. In the process, communication quality information, for example, sidelink discovery reference signal received power (SD-RSRP), obtained through measurement at a PHY layer, needs to be used. If the foregoing solution is used, the remote UE learns, at the MAC layer only after completing PHY layer message processing, that a PHY layer message is a discovery message. Therefore, the remote UE further needs to deliver an SL measurement configuration to measure the SD-RSRP for the relay selection. Consequently, a large delay is always caused.

Therefore, in the process of implementing the relay discovery by using existing PC5-U, how to avoid the large delay caused due to the SD-RSRP measurement is an urgent problem to be resolved currently.

SUMMARY

Embodiments of this application provide a communication method, a device, and a system, to resolve a problem that a large delay is caused due to SD-RSRP measurement in a process of implementing relay discovery by using existing PC5-U in a conventional technology.

To achieve the foregoing objective, the following technical solutions are used in embodiments of this application.

According to a first aspect, a communication method is provided. The method includes: A first terminal device receives first sidelink control information (SCI) and a first message from a second terminal device, where the first SCI includes a first identifier, the first identifier is used to indicate that the first message is a discovery message, and the discovery message is used to indicate that the second terminal device is a relay terminal device. The first terminal device determines, based on the first identifier, that the first message is the discovery message. A large delay may be caused in a process of implementing relay discovery by using existing PC5-U in a conventional technology. In this embodiment of this application, when sending the first message to the first terminal device, the second terminal device may also send the first SCI including the first identifier to the first terminal device, where the first identifier is used to indicate that the first message is the discovery message. Because the first identifier is carried in the first SCI, the first terminal device may parse the first SCI at a PHY layer after receiving the first SCI. Therefore, the first terminal device may learn, at the PHY layer based on the first identifier in the first SCI, that the first message is the discovery message, so that a case in which the large delay may be caused in the process of implementing the relay discovery by using existing PC5-U in the conventional technology is avoided.

According to a second aspect, a communication method is provided. The method includes: A first terminal device receives a first message from a second terminal device. The first terminal device determines, based on a first resource for transmitting the first message, that the first message is a discovery message, where the first resource is a resource specially used to transmit a discovery message, and the discovery message is used to indicate that the second terminal device is a relay terminal device. A large delay may be caused in a process of implementing relay discovery by using existing PC5-U in a conventional technology. In this embodiment of this application, the second terminal device sends the first message to the first terminal device on the first resource. After receiving the first message, the first terminal device may learn, at a PHY layer, of the first resource for transmitting the first message. In addition, the first resource is the resource specially used to transmit a discovery message. Therefore, the first terminal device may learn, at the PHY layer based on the first resource, that the first message is the discovery message, so that a case in which the large delay may be caused in the process of implementing the relay discovery by using existing PC5-U in the conventional technology is avoided.

With reference to the first aspect or the second aspect, in a possible implementation, the first message includes a first parameter. The communication method provided in this embodiment of this application further includes: the first terminal device determines, based on the first parameter, that the second terminal device satisfies a capability requirement of the first terminal device or that the second terminal device does not satisfy a capability requirement of the first terminal device. Compared with a current public safety application scenario, a future relay communication application scenario including V2X additionally requires capability matching between a network device, the first terminal device, and the second terminal device. However, currently, in an NR relay communication scenario, there is no solution to a capability matching problem of the network device, the first terminal device, and the second terminal device. The first message in this embodiment of this application may carry the first parameter, and the first terminal device may determine, based on the first parameter, whether the second terminal device satisfies the capability requirement of the first terminal device, so that the capability matching problem of the network device, the first terminal device, and the second terminal device is resolved.

With reference to the first aspect or the second aspect, in a possible implementation, the first parameter includes an identifier of a network that provides a service for the second terminal device. Correspondingly, that the first terminal device determines, based on the first parameter, that the second terminal device satisfies a capability requirement of the first terminal device includes: The first terminal device, determines, based on the identifier of the network that provides the service for the second terminal device, that the network that provides the service for the second terminal device is within connection permission of the first terminal device. That is, in this embodiment of this application, the capability requirement of the first terminal device may include a connection permission requirement.

With reference to the first aspect or the second aspect, in a possible implementation, the first parameter further includes network slice capability information of the second terminal device, and the determining that the second terminal device satisfies a capability requirement of the first terminal device further includes: The first terminal device determines, based on the slice capability information of the second terminal device, that a slice capability of the second terminal device satisfies a slice capability requirement of the first terminal device. That is, in this embodiment of this application, the capability requirement of the first terminal device may further include the slice capability requirement.

With reference to the first aspect or the second aspect, in a possible implementation, the first parameter further includes first indication information, and the first indication information indicates that a network device accessed by the second terminal device is a network device of a first type or a network device of a second type. The determining that the second terminal device satisfies a capability requirement of the first terminal device further includes: When a network device only to which the first terminal device supports establishment of a connection is the network device of the first type, the first terminal device determines, based on the first indication information, whether the network device accessed by the second terminal device is the network device of the first type; when a network device only to which the first terminal device supports establishment of a connection is the network device of the second type, the first terminal device determines, based on the first indication information, that the network device accessed by the second terminal device is the network device of the second type; or when network devices to which the first terminal device supports establishment of connections are the network device of the first type and the network device of the second type, the first terminal device determines, based on the first indication information, that the network device accessed by the second terminal device is the network device of the first type or the network device of the second type. That is, in this embodiment of this application, the capability requirement of the first terminal device may further include a type requirement of the network device to which the first terminal device supports the establishment of the connection.

With reference to the first aspect or the second aspect, in a possible implementation, when the first indication information indicates that the network device accessed by the second terminal device is the network device of the first type, the first parameter further includes a type of a core network to which the network device accessed by the second terminal device is connected. The type of the core network to which the network device accessed by the second terminal device is connected may be used for subsequent relay selection.

According to a third aspect, a communication method is provided. The method includes: A first terminal device receives a first message from a second terminal device, where the first message includes a first parameter. The first terminal device determines, based on the first parameter, that the second terminal device satisfies a capability requirement of the first terminal device or that the second terminal device does not satisfy a capability requirement of the first terminal device. Compared with a current public safety application scenario, a future relay communication application scenario including V2X additionally requires capability matching between a network device, the first terminal device, and the second terminal device. However, currently, in an NR relay communication scenario, there is no solution to a capability matching problem of the network device, the first terminal device, and the second terminal device. The first message in this embodiment of this application may carry the first parameter, and the first terminal device may determine, based on the first parameter, whether the second terminal device satisfies the capability requirement of the first terminal device, so that the capability matching problem of the network device, the first terminal device, and the second terminal device is resolved.

Optionally, for related descriptions of the first parameter and a manner in which the first terminal device determines, based on the first parameter, that the second terminal device satisfies the capability requirement of the first terminal device, refer to the first aspect or the second aspect. Details are not described herein again.

With reference to the first aspect, the second aspect, or the third aspect, in a possible implementation, the communication method provided in this embodiment of this application further includes: The first terminal device sends a second message to the second terminal device, where the second message carries a second parameter, and the second parameter is used to determine that the second terminal device satisfies the capability requirement of the first terminal device. Compared with the current public safety application scenario, the future relay communication application scenario including V2X additionally requires the capability matching between the network device, the first terminal device, and the second terminal device. However, currently, in the NR relay communication scenario, there is no solution to the capability matching problem of the network device, the first terminal device, and the second terminal device. The second message in this embodiment of this application may carry the second parameter, and the second parameter is used to determine that the second terminal device satisfies the capability requirement of the first terminal device, so that the capability matching problem of the network device, the first terminal device, and the second terminal device is resolved.

With reference to the first aspect, the second aspect, or the third aspect, in a possible implementation, the second parameter includes an identifier list of networks that the first terminal device is permitted to access. That is, in this embodiment of this application, the capability requirement of the first terminal device may include the connection permission requirement.

With reference to the first aspect, the second aspect, or the third aspect, in a possible implementation, the second parameter further includes at least one of second indication information or the slice capability requirement of the first terminal device, and the second indication information indicates that the network devices/the network device to which the first terminal device supports the establishment of the connections/the connection are/is the network device of the first type and/or the network device of the second type. That is, in this embodiment of this application, the capability requirement of the first terminal device may further include at least one of the slice capability requirement or the type requirement of the network device to which the first terminal device supports the establishment of the connection.

With reference to the first aspect, the second aspect, or the third aspect, in a possible implementation, that the first terminal device sends a second message to the second terminal device includes: The first terminal device sends the second message to the second terminal device on a second resource, where the second resource is a resource specially used to transmit a discovery message. After receiving the second message, the first terminal device may learn, at the PHY layer, of the second resource for transmitting the second message. In addition, the first resource is the resource specially used to transmit a discovery message. Therefore, the second terminal device may learn, at the PHY layer based on the second resource, that the second message is the discovery message.

With reference to the first aspect, the second aspect, or the third aspect, in a possible implementation, the communication method provided in this embodiment of this application further includes: The first terminal device sends second SCI to the second terminal device, where the second SCI includes a first identifier, and the first identifier is used to indicate that the second message is a discovery message. The first identifier is carried in the second SCI, and the second terminal device may parse the second SCI at the PHY layer after receiving the second SCI. Therefore, the second terminal device may learn, at the PHY layer based on the first identifier in the second SCI, that the second message is the discovery message.

With reference to the first aspect, the second aspect, or the third aspect, in a possible implementation, the communication method provided in this embodiment of this application further includes: The first terminal device selects, according to a preset criterion, a target second terminal device from a plurality of second terminal devices that satisfy the capability requirement of the first terminal device. Currently, in the NR relay communication scenario, there is no solution to a problem of how to select a most appropriate target second terminal device when the plurality of second terminal devices satisfy the capability requirement of the first terminal device. In this embodiment of this application, the first terminal device may select, according to the preset criterion, the target second terminal device from the second terminal devices that satisfy the capability requirement of the first terminal device, so that the problem of selecting the target second terminal device is resolved.

With reference to the first aspect, the second aspect, or the third aspect, in a possible implementation, the preset criterion includes a first preset criterion, and the first preset criterion is used to determine one or more second terminal devices with a high priority. Optionally, the one or more second terminal devices with the high priority may be the foregoing target second terminal device.

With reference to the first aspect, the second aspect, or the third aspect, in a possible implementation, the first preset criterion includes one or more of the following: A second terminal device that accesses a first network device has a high priority, where the first network device is a network device accessed by the first terminal device; a second terminal device that accesses a network device connected to a core network whose type is a target core network type has a high priority; a second terminal device whose resource pool channel busy degree is not greater than a first threshold has a high priority; a second terminal device whose power measurement value is not less than a second threshold has a high priority; or when the network devices to which the first terminal device supports the establishment of the connections are the network device of the first type and the network device of the second type, a second terminal device that accesses a network device of a target type has a high priority, where the target type is a network device type determined by the first terminal device by default, or the target type is a network device type corresponding to a high-priority service of the first terminal device.

With reference to the first aspect, the second aspect, or the third aspect, in a possible implementation, the preset criterion further includes a second preset criterion, and the second preset criterion is used to select the target second terminal device from the one or more second terminal devices with the high priority.

With reference to the first aspect, the second aspect, or the third aspect, in a possible implementation, the second preset criterion includes: The target second terminal device is a second terminal device corresponding to a lowest resource pool channel busy degree in the one or more second terminal devices with the high priority; or the target second terminal device is a second terminal device corresponding to a largest power measurement value in the one or more second terminal devices with the high priority.

With reference to the first aspect, the second aspect, or the third aspect, in a possible implementation, the preset criterion includes: The target second terminal device is a second terminal device corresponding to a lowest resource pool channel busy degree in the plurality of second terminal devices that satisfy the capability requirement of the first terminal device; or the target second terminal device is a second terminal device corresponding to a largest power measurement value in the plurality of second terminal devices that satisfy the capability requirement of the first terminal device.

With reference to the first aspect, the second aspect, or the third aspect, in a possible implementation, the first type is long term evolution LTE, and the second type is new radio NR.

Correspondingly, the network device of the first type is an evolved node eNB in an LTE system, and the network device of the second type is an evolved node gNB in an NR system.

According to a fourth aspect, a communication method is provided. The method includes: A second terminal device obtains first sidelink control information (SCI), where the first SCI includes a first identifier, the first identifier is used to indicate that a first message is a discovery message, and the discovery message is used to indicate that the second terminal device is a relay terminal device. The second terminal device sends the first SCI and the first message to a first terminal device. For technical effects of the fourth aspect, refer to the technical effects of the first aspect. Details are not described herein again.

According to a fifth aspect, a communication method is provided. The method includes: A second terminal device determines a first resource, where the first resource is a resource specially used to transmit a discovery message, and the discovery message is used to indicate that the second terminal device is a relay terminal device. The second terminal device sends a first message to a first terminal device on the first resource. For technical effects of the fifth aspect, refer to the technical effects of the second aspect. Details are not described herein again.

With reference to the fourth aspect or the fifth aspect, in a possible implementation, the first message includes a first parameter, and the first parameter is used to determine that the second terminal device satisfies a capability requirement of the first terminal device or that the second terminal device does not satisfy a capability requirement of the first terminal device.

With reference to the fourth aspect or the fifth aspect, in a possible implementation, the first parameter includes an identifier of a network that provides a service for the second terminal device.

With reference to the fourth aspect or the fifth aspect, in a possible implementation, the first parameter further includes at least one of first indication information or network slice capability information of the second terminal device, and the first indication information indicates that a network device accessed by the second terminal device is a network device of a first type or a network device of a second type.

With reference to the fourth aspect or the fifth aspect, in a possible implementation, when the first indication information indicates that the network device accessed by the second terminal device is the network device of the first type, the first parameter further includes a type of a core network to which the network device accessed by the second terminal device is connected.

According to a sixth aspect, a communication method is provided. The method includes: A second terminal device determines a first parameter. The second terminal device sends a first message to a first terminal device, where the first message includes the first parameter, and the first parameter is used to determine that the second terminal device satisfies a capability requirement of the first terminal device or that the second terminal device does not satisfy a capability requirement of the first terminal device. For technical effects of the sixth aspect, refer to the technical effects of the third aspect. Details are not described herein again.

Optionally, for related descriptions of the first parameter and a manner in which the first terminal device determines, based on the first parameter, that the second terminal device satisfies the capability requirement of the first terminal device, refer to the first aspect. Details are not described herein again.

With reference to the fourth aspect, the fifth aspect, or the sixth aspect, in a possible implementation, the communication method provided in this embodiment of this application further includes: The second terminal device receives a second message from the first terminal device, where the second message carries a second parameter. The second terminal device determines that the second message is a discovery message. The second terminal device determines, based on the second parameter, that the second terminal device satisfies the capability requirement of the first terminal device.

With reference to the fourth aspect, the fifth aspect, or the sixth aspect, in a possible implementation, the communication method provided in this embodiment of this application further includes. The second terminal device receives second SCI from the first terminal device, where the second SCI includes a first identifier, and the first identifier is used to indicate that the second message is the discovery message. The second terminal device determines, based on the first identifier, that the second message is the discovery message.

With reference to the fourth aspect, the fifth aspect, or the sixth aspect, in a possible implementation, the method further includes: The second terminal device determines, based on a second resource for transmitting the second message, that the second message is the discovery message, where the second resource is a resource specially used to transmit a discovery message.

With reference to the fourth aspect, the fifth aspect, or the sixth aspect, in a possible implementation, the second parameter includes an identifier list of networks that the first terminal device is permitted to access. Correspondingly, that the second terminal device determines, based on the second parameter, that the second terminal device satisfies the capability requirement of the first terminal device includes: The second terminal device determines, based on the identifier list of the networks that the first terminal device is permitted to access, that the network that provides the service for the second terminal device is within connection permission of the first terminal device.

With reference to the fourth aspect, the fifth aspect, or the sixth aspect, in a possible implementation, the second parameter further includes a slice capability requirement of the first terminal device, and that the second terminal device determines that the second terminal device satisfies the capability requirement of the first terminal device further includes: The second terminal device determines, based on the slice capability requirement of the first terminal device, that a slice capability of the second terminal device satisfies the slice capability requirement of the first terminal device.

With reference to the fourth aspect, the fifth aspect, or the sixth aspect, in a possible implementation, the second parameter further includes second indication information, and the second indication information indicates that network devices/a network device to which the first terminal device supports establishment of connections/a connection are/is the network device of the first type and/or the network device of the second type. That the second terminal device determines that the second terminal device satisfies the capability requirement of the first terminal device further includes: When the second indication information indicates that the network device only to which the first terminal device supports the establishment of the connection is the network device of the first type, the second terminal device determines that the network device accessed by the second terminal device is the network device of the first type; when the second indication information indicates that the network device only to which the first terminal device supports the establishment of the connection is the network device of the second type, the second terminal device determines that the network device accessed by the second terminal device is the network device of the second type; or when the second indication information indicates that the network devices to which the first terminal device supports the establishment of the connections are the network device of the first type and the network device of the second type, the second terminal device determines that the network device accessed by the second terminal device is the network device of the first type or the network device of the second type.

According to a seventh aspect, a relay selection method is provided. The method includes: A first terminal device determines a plurality of second terminal devices that satisfy a capability requirement of the first terminal device. The first terminal device selects, according to a preset criterion, a target second terminal device from the plurality of second terminal devices that satisfy the capability requirement of the first terminal device. Currently, in an NR relay communication scenario, there is no solution to a problem of how to select a most appropriate target second terminal device when the plurality of second terminal devices satisfy the capability requirement of the first terminal device. In this embodiment of this application, the first terminal device may select, according to the preset criterion, the target second terminal device from the second terminal devices that satisfy the capability requirement of the first terminal device, so that the problem of selecting the target second terminal device is resolved.

For related descriptions of the preset criterion, refer to the first aspect. Details are not described herein again.

According to an eighth aspect, a communication apparatus is provided, to implement the foregoing methods. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a ninth aspect, a communication apparatus is provided, and includes a processor and an interface circuit. The interface circuit is configured to receive a signal from a communication apparatus other than the communication apparatus and transmit the signal to the processor, or send a signal from the processor to a communication apparatus other than the communication apparatus. The processor is configured to implement the method according to any one of the foregoing aspects by using a logic circuit or by executing code instructions.

In a possible design, the communication apparatus further includes a memory. The memory is configured to store computer instructions. When the processor executes the instructions, the communication apparatus is enabled to perform the method according to any one of the foregoing aspects.

According to a tenth aspect, a communication apparatus is provided, and includes a processor. The processor is configured to: after being coupled to a memory, and reading instructions in the memory, perform the method according to any one of the foregoing aspects according to the instructions.

In a possible design, the communication apparatus further includes the memory. The memory is configured to store program instructions and data that are necessary. When the communication apparatus is a chip system, the communication apparatus may include a chip, or may include the chip and another discrete component.

According to an eleventh aspect, a computer-readable storage medium is provided. The computer-readable storage medium stores instructions. When the instructions are executed by a communication apparatus, the communication apparatus is enabled to implement the method according to any one of the foregoing aspects.

According to a twelfth aspect, a computer program product including instructions is provided. When the instructions are executed by a communication apparatus, the communication apparatus is enabled to implement the method according to any one of the foregoing aspects.

For technical effects brought by any design of the eighth aspect to the twelfth aspect, refer to the technical effects brought by any one of the first aspect to the seventh aspect. Details are not described herein again.

According to a thirteenth aspect, a communication system is provided. The communication system includes a communication apparatus configured to implement the method according to the first aspect and a communication apparatus configured to perform the method according to the fourth aspect. Alternatively, the communication system includes a communication apparatus configured to implement the method according to the second aspect and a communication apparatus configured to perform the method according to the fifth aspect. Alternatively, the communication system includes a communication apparatus configured to implement the method according to the third aspect and a communication apparatus configured to perform the method according to the sixth aspect.

DESCRIPTION OF EMBODIMENTS

Figure 1:
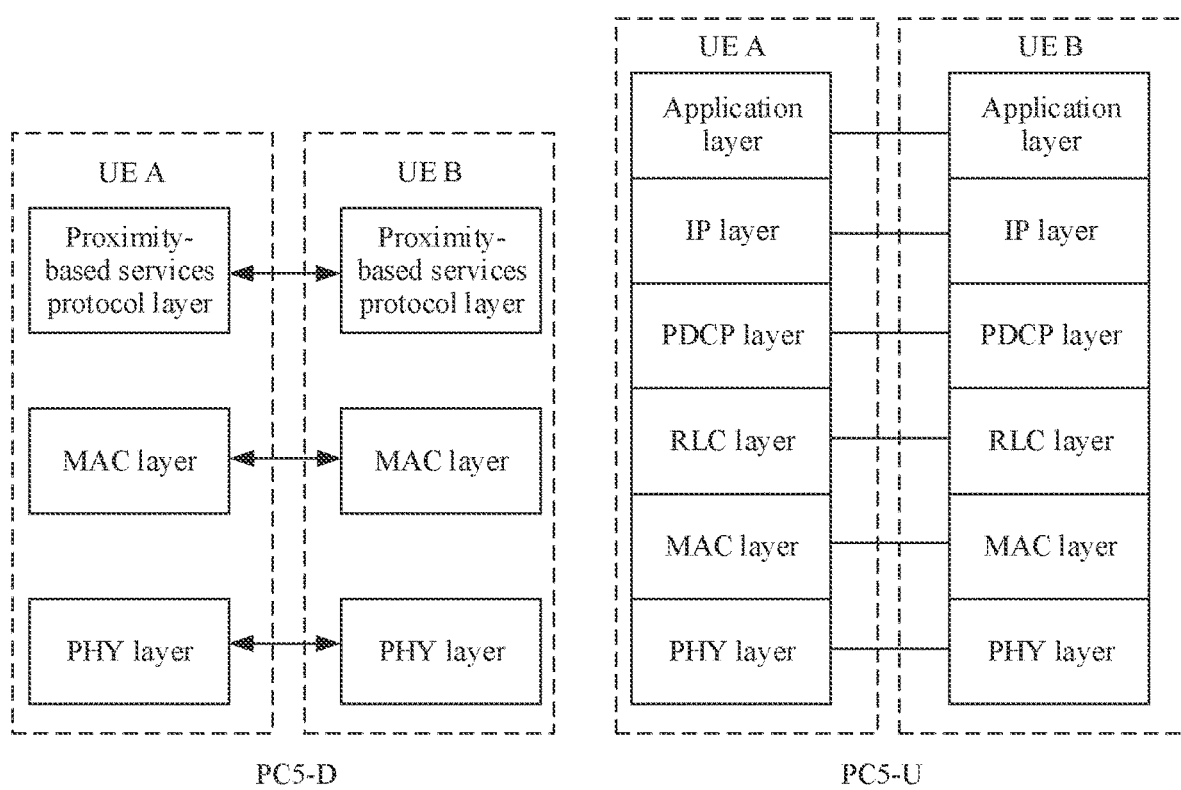
FIG. 1 is a schematic diagram of existing protocol stacks used for relay discovery and SL communication in R15.

The following describes technical solutions in embodiments of this application with reference to the accompanying drawings in embodiments of this application. In descriptions of this application, unless otherwise specified, "I" represents an "or" relationship between associated objects. For example, A/B may represent A or B. In this application, "and/or" describes only an association relationship between associated objects and represents that three relationships may exist. For example, A and/or B may represent the following three cases: Only A exists, both A and B exist, and only B exists, where A or B may be singular or plural. In addition, in the descriptions of this application, "a plurality of" means two or more than two unless otherwise specified. "At least one of the following" or a similar expression thereof means any combination of these items, and includes a singular item or any combination of plural items. For example, at least one of a, b, or c may represent a, b, c, a combination of a and b, a combination of a and c, a combination of b and c, or a combination of a, b, and c, where a, b, and c may be in a singular or plural form. In addition, to clearly describe the technical solutions in embodiments of this application, terms such as "first" and "second" are used in embodiments of this application to distinguish between same items or similar items whose functions and purposes are basically the same. A person skilled in the art may understand that the terms such as "first" and "second" do not limit a quantity or an execution sequence, and the terms such as "first" and "second" do not indicate a definite difference. In addition, in embodiments of this application, the word such as "exemplary" or "for example" is used to represent giving an example, an illustration, or a description. Any embodiment or design scheme described as "exemplary" or "for example" in embodiments of this application should not be explained as being more preferred or having more advantages than another embodiment or design scheme. Exactly, use of the word such as "exemplary" or "for example" is intended to present a relative concept in a specific manner for ease of understanding.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a fifth generation (5G) communication system (which may also be referred to as a new radio (NR) system), or a future communication system, for example, a sixth generation communication system. The 5G system in this application includes a non-standalone (NSA) 5G system or a standalone (SA) 5G system. This is not specifically limited in embodiments of this application. In addition, the communication system may alternatively be a public land mobile network (PLMN) network, a device-to-device (D2D) communication system, a machine to machine (M2M) communication system, a vehicle to everything (V2X) communication system, an internet of things (IoT) communication system, or another communication system.

Figure 2:
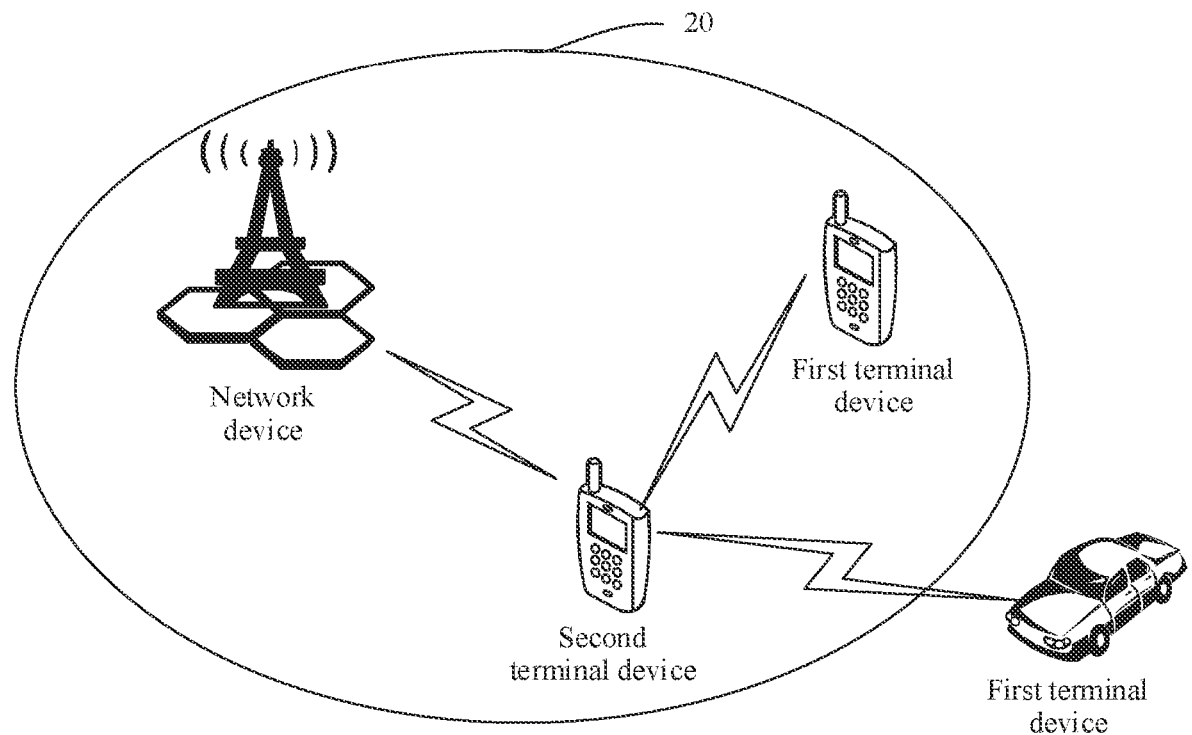
FIG. 2 is a schematic diagram of an architecture of a communication system according to an embodiment of this application.

FIG. 2 shows a communication system 20 according to an embodiment of this application. The communication system 20 includes a first terminal device, a second terminal device, and a network device.

The second terminal device is within a service range of the network device, supports provision of a relay service for a nearby user, and therefore may also be referred to as a relay terminal device. Quality of communication between the first terminal device and the network device is poor or the first terminal device is not within the service range of the network device. The first terminal device selects a relay function of the second terminal device to implement communication, and therefore may also be referred to as a remote terminal device. This is uniformly described herein. Details are not described below again.

Optionally, a terminal device (including the first terminal device or the second terminal device) in embodiments of this application may support only an LTE service, support only an NR service, or support both the LTE service and the NR service. A relay service between two terminal devices may also support only LTE, support only NR, or support both LTE and NR. This is not specifically limited in embodiment of this application.

Optionally, the terminal device in embodiments of this application may be various devices that provide a voice and/or data connectivity for a user. The terminal device may communicate with a core network through an access network, for example, a radio access network (RAN), and exchange a voice and/or data with the RAN. For example, the terminal device may include UE, a wireless terminal, a mobile terminal, a subscriber unit, a subscriber station, a mobile station, a remote station, an access point (AP), a remote terminal, an access terminal, a user terminal, a user agent, a user device, a mobile phone (or referred to as a "cellular" phone), a computer having a mobile terminal, a portable, pocket-sized, handheld, computer built-in, or in-vehicle mobile apparatus, a wearable device, a personal communications service (PCS) phone, a cordless phone, a session initiation protocol (SIP) phone, a wireless local loop (WLL) station, a personal digital assistant (PDA), a smart band, a smartwatch, a terminal device in a future 5G network, a terminal device in a future evolved PLMN, a terminal device in future vehicle to everything, or the like. In addition, the terminal device may further include a limited device, for example, a device with low power consumption, a device with a limited storage capability, or a device with a limited computing capability, and includes, for example, an information sensing device such as a barcode, a radio frequency identification (RFID), a sensor, a global positioning system (GPS), and a laser scanner. In addition, the terminal device may alternatively be an uncrewed aerial vehicle device. In embodiments of this application, a chip used in the foregoing device may also be referred to as a terminal device.

By way of example but not limitation, in embodiments of this application, the wireless terminal may be a mobile phone, a tablet computer, a computer having a wireless transceiver function, a virtual reality terminal device, an augmented reality terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like.

By way of example but not limitation, in embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is directly worn, or is a portable device integrated into clothes or an accessory of the user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus only on one type of application function and need to work with other devices such as smartphones, for example, various smart bands or smart jewelry for monitoring physical signs.

In addition, in embodiments of this application, the terminal device may alternatively be a terminal device in an IoT system. An IoT is an important component of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrowband (NB) technology.

In addition, in embodiments of this application, the terminal device may further include a sensor, for example, an intelligent printer, a train detector, or a gas station. Main functions include: collecting data (for some terminal devices), receiving control information and downlink data of an access network device, sending an electromagnetic wave, and transmitting uplink data to the access network device.

Optionally, the network device in embodiments of this application may be any communication device that has a wireless transceiver function and that is configured to communicate with the terminal device. The network device includes but is not limited to: a radio network controller (RNC), a NodeB (NB), a base station controller (BSC), a base transceiver station (BTS), a home base station (home evolved NodeB, HeNB, or home NodeB, HNB), a baseband unit (BBU), an access point (AP) in a wireless fidelity (Wi-Fi) system, a wireless relay node, a wireless backhaul node, a transmission point (TP), a TRP, or the like. Alternatively, the network device may be an evolved NB (eNB) in an LTE system, a next generation NB (gNB), a TRP, a TP in an NR system, or one antenna panel or a group of (including a plurality of antenna panels) antenna panels of the gNB in the NR system. In addition, the network device may alternatively be a network node included in a gNB or a TP, for example, a BBU or a distributed unit (DU).

In some deployment, the gNB may include a centralized unit (CU) and the DU. In addition, the gNB may further include an active antenna unit (AAU). The CU implements some functions of the gNB, and the DU implements some functions of the gNB. For example, the CU is responsible for processing a non-real-time protocol and service, to implement functions of a radio resource control (RRC) layer and a PDCP layer. The DU is responsible for processing a physical layer protocol and a real-time service, and implementing functions of an RLC layer, a MAC layer, and a PHY layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node.

Optionally, the network device and the terminal device in embodiments of this application may communicate with each other by using a licensed spectrum, may communicate with each other by using an unlicensed spectrum, or may communicate with each other by using both the licensed spectrum and the unlicensed spectrum. The network device and the terminal device may communicate with each other by using a spectrum below 6 gigahertz (GHz), may communicate with each other by using a spectrum above 6 GHz, or may communicate with each other by using both the spectrum below 6 GHz and the spectrum above 6 GHz. A spectrum resource used between the network device and the terminal device is not limited in embodiments of this application.

Optionally, the terminal device or the network device in embodiments of this application may be deployed on land, and include an indoor, outdoor, handheld, or vehicle-mounted device; may be deployed on water; or may be deployed on an airplane, a balloon and a satellite in the air. Application scenarios of the terminal device or the network device are not limited in embodiments of this application.

Optionally, a related function of the terminal device or the network device in embodiments of this application may be implemented by one device, may be jointly implemented by a plurality of devices, or may be implemented by one or more function modules in one device. This is not specifically limited in embodiments of this application. It may be understood that the foregoing function may be a network element in a hardware device, a software function running on dedicated hardware, a combination of hardware and software, or a virtualization function instantiated on a platform (for example, a cloud platform).

Figure 3:
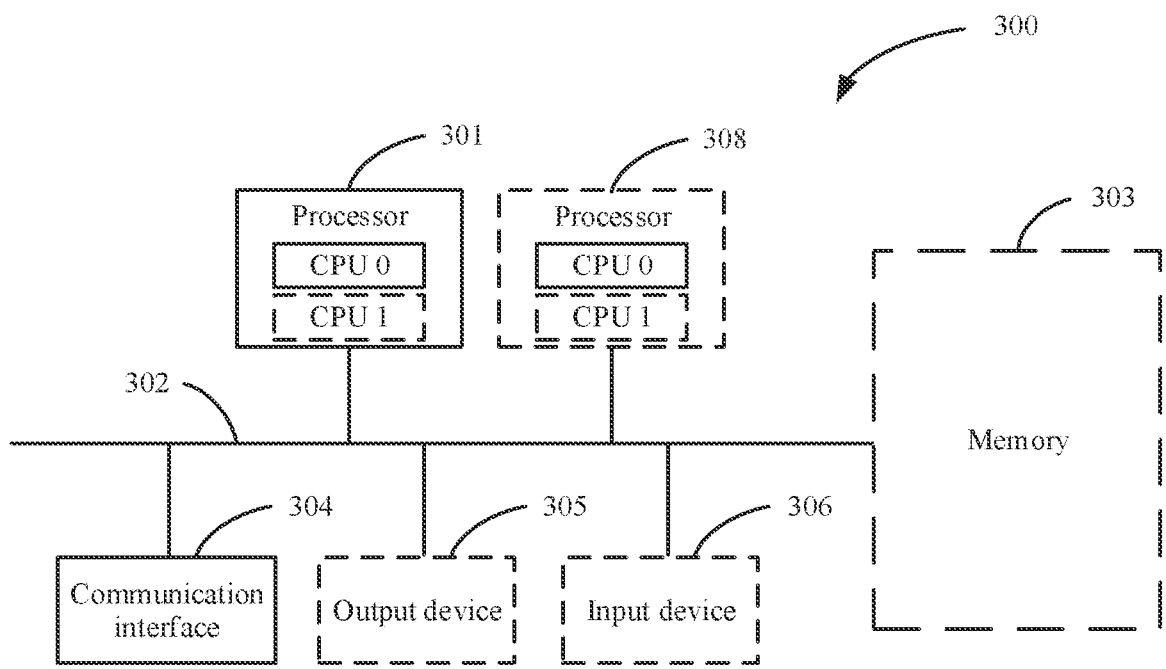
FIG. 3 is a schematic diagram 1 of a structure of a communication apparatus according to an embodiment of this application.

For example, the related function of the terminal device or the network device in embodiments of this application may be implemented by a communication apparatus 300 in FIG. 3. FIG. 3 is a schematic diagram of a structure of a communication apparatus 300 according to an embodiment of this application. The communication apparatus 300 includes one or more processors 301, a communication line 302, and at least one communication interface (in FIG. 3, only an example in which a communication interface 304 and one processor 301 are included is used for description). Optionally, the communication apparatus 300 may further include a memory 303.

The processor 301 may be a central processing unit (CPU), a microprocessor, an application-specific integrated circuit (ASIC), or one or more integrated circuits configured to control program execution of the solutions in this application.

The communication line 302 may include a path used to connect different components.

The communication interface 304 may be a transceiver module configured to communicate with another device or a communication network, for example, the Ethernet, a RAN, or a wireless local area network (WLAN). For example, the transceiver module may be an apparatus such as a transceiver or a transceiver. Optionally, the communication interface 304 may alternatively be a transceiver circuit located inside the processor 301, and is configured to implement signal input and signal output of the processor.

The memory 303 may be an apparatus having a storage function. For example, the memory 303 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, or the like), a disk storage medium, another magnetic storage device, or any other medium that can be used to carry or store expected program code in a form of instructions or a data structure and that can be accessed by a computer. However, the memory 303 is not limited thereto. The memory may exist independently, and is connected to the processor through the communication line 302. Alternatively, the memory may be integrated with the processor.

The memory 303 is configured to store computer-executable instructions for performing the solutions in this application, and the processor 301 controls execution. The processor 301 is configured to execute the computer-executable instructions stored in the memory 303, to implement communication methods provided in embodiments of this application.

Alternatively, in this embodiment of this application, the processor 301 may implement a processing-related function in the communication methods provided in the following embodiments of this application, and the communication interface 304 may be responsible for communicating with the another device or the communication network. This is not specifically limited in this embodiment of this application.

The computer-executable instructions in this embodiment of this application may also be referred to as application program code. This is not specifically limited in this embodiment of this application.

During specific implementation, in an embodiment, the processor 301 may include one or more CPUs such as a CPU 0 and a CPU 1 in FIG. 3.

During specific implementation, in an embodiment, the communication apparatus 300 may include a plurality of processors such as the processor 301 and a processor 308 in FIG. 3. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication apparatus 300 may further include an output device 305 and an input device 306. The output device 305 communicates with the processor 301, and may display information in a plurality of manners.

The communication apparatus 300 may be a general-purpose apparatus or a dedicated apparatus. For example, the communication apparatus 300 may be a desktop computer, a portable computer, a network server, a personal digital assistant (PDA), a mobile phone, a tablet computer, a wireless terminal device, an embedded device, or a device having a structure similar to that in FIG. 3. A type of the communication apparatus 300 is not limited in this embodiment of this application.

The following describes the communication methods provided in embodiments of this application in detail with reference to FIG. 1 to FIG. 3.

It should be noted that names of messages between the network elements, names of parameters in the messages, or the like in the following embodiments of this application are merely examples, and there may alternatively be other names during specific implementation. This is not specifically limited in embodiments of this application.

First, embodiments of this application are applicable to all scenarios of SL communication. Currently, the SL communication includes three scenarios shown in FIG. 4. The three scenarios are separately described as follows:

Scenario 1: The scenario 1 is an LTE SL relay communication scenario served by an LTE eNB. In this scenario, the eNB (namely, the network device in the communication system shown in FIG. 2) communicates with a relay terminal device (namely, the second terminal device in the communication system shown in FIG. 2) through an LTE Uu interface, and the relay terminal device communicates with a remote terminal device (namely, the second terminal device in the communication system shown in FIG. 2) by using an LTE SL protocol. That is, a type of a core network to which the remote terminal device is connected is an evolved packet core (EPC).

Scenario 2: The scenario 2 is an NR SL relay communication scenario served by an NR gNB. In this scenario, the gNB (namely, the network device in the communication system shown in FIG. 2) communicates with a relay terminal device (namely, the second terminal device in the communication system shown in FIG. 2) through an NR Uu interface, and the relay terminal device communicates with a remote terminal device (namely, the second terminal device in the communication system shown in FIG. 2) by using an NR SL protocol. That is, a type of a core network to which the remote terminal device is connected is a 5G core (5GC).

Scenario 3: The scenario 3 is an NR SL relay communication scenario served by an evolved LTE (eLTE) eNB. In this scenario, the eNB (namely, the network device in the communication system shown in FIG. 2) communicates with a relay terminal device (namely, the second terminal device in the communication system shown in FIG. 2) through an LTE Uu interface, and the relay terminal device communicates with a remote terminal device (namely, the second terminal device in the communication system shown in FIG. 2) by using an NR SL protocol. That is, a type of a core network to which the remote terminal device is connected is a 5GC.

It should be understood that the foregoing embodiments merely provides examples of several current scenarios of the SL communication. In a future communication system, more scenarios may be further introduced. This is not specifically limited in embodiments of this application.

Figure 5:
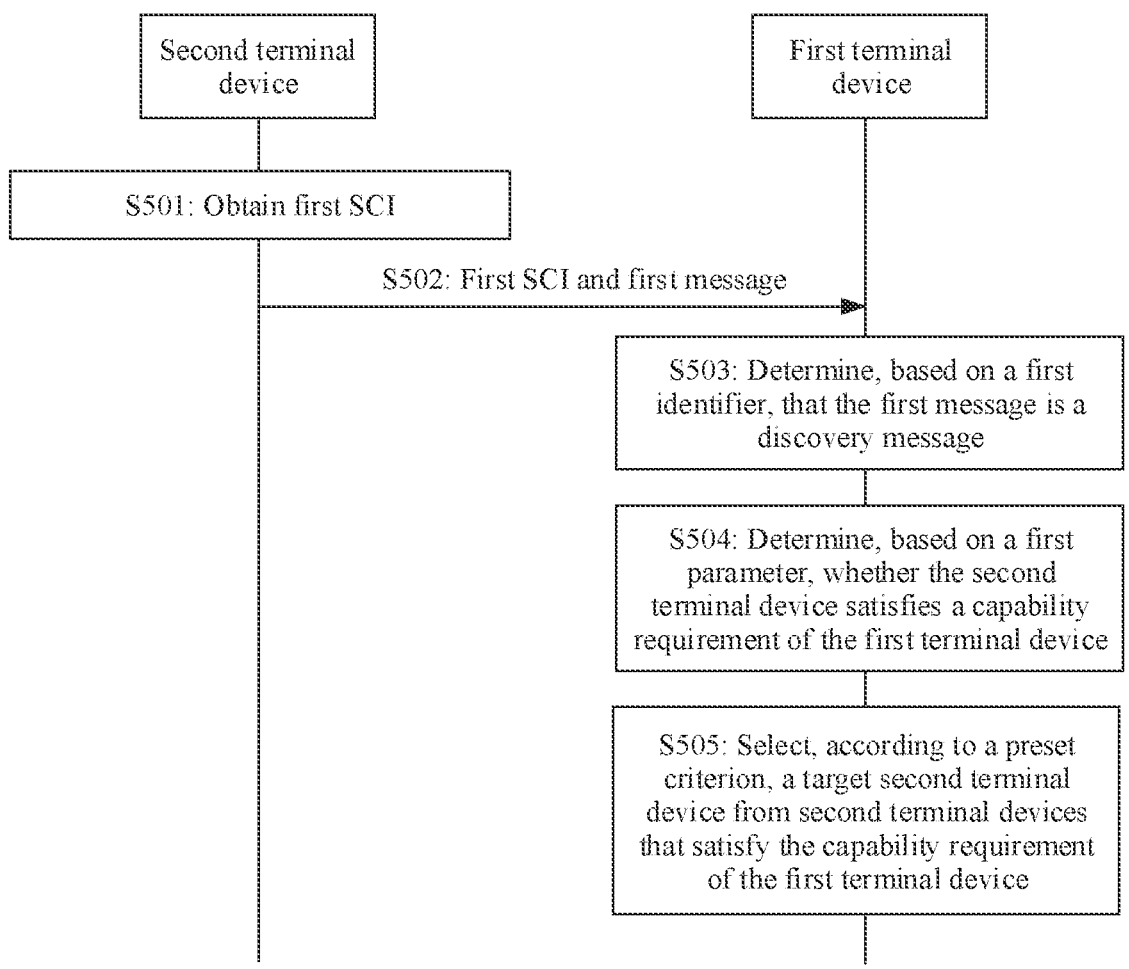
FIG. 5 is a schematic flowchart 1 of a communication method according to an embodiment of this application.

FIG. 5 shows a communication method according to an embodiment of this application. The method includes the following steps.

S501: A second terminal device obtains first SCI, where the first SCI includes a first identifier, the first identifier is used to indicate that a first message is a discovery message, and the discovery message is used to indicate that the second terminal device is a relay terminal device.

S502: The second terminal device sends the first SCI and the first message to a first terminal device, and correspondingly, the first terminal device receives the first SCI and the first message from the second terminal device.

For example, the first message in this embodiment of this application may be an announcement message.

Optionally, in this embodiment of this application, the second terminal device may broadcast the first message and the first SCI in a broadcast manner, and the nearby first terminal device may receive the first message and the first SCI that are broadcast by the second terminal device.

Optionally, the first message in this embodiment of this application may include a first parameter, and the first parameter is used to determine whether the second terminal device satisfies a capability requirement of the first terminal device. The capability requirement may be, for example, a slice capability requirement, a connection permission requirement, or a type requirement of a network device to which the first terminal device supports establishment of a connection. This is not specifically limited in this embodiment of this application.

The first parameter in this embodiment of this application may include an identifier of a network that provides a service for the second terminal device, and the identifier of the network that provides the service for the second terminal device is used to determine whether the second terminal device satisfies the connection permission requirement of the first terminal device.

Optionally, the first parameter in this embodiment of this application may further include at least one of network slice capability information of the second terminal device or first indication information, and the first indication information indicates that a network device accessed by the second terminal device is a network device of a first type or a network device of a second type. The network slice capability information of the second terminal device is used to determine whether the second terminal device satisfies the slice capability requirement of the first terminal device, and the first indication information is used to determine whether the second terminal device satisfies the type requirement of the network device to which the first terminal device supports the establishment of the connection.

Optionally, in this embodiment of this application, when the first indication information indicates that the network device accessed by the second terminal device is the network device of the first type, the first parameter may further include a type of a core network to which the network device accessed by the second terminal device is connected.

Figure 4:
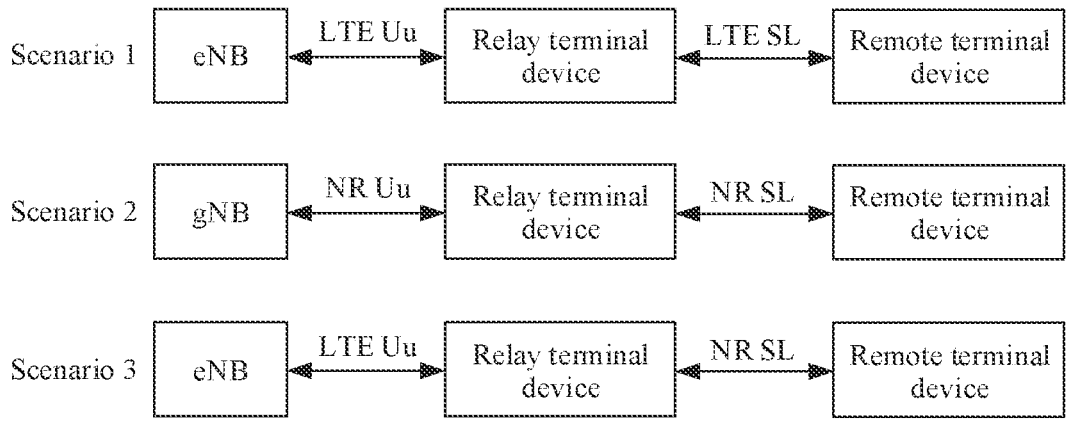
FIG. 4 is a schematic diagram of a scenario used for SL communication according to an embodiment of this application.

For example, with reference to the three scenarios shown in FIG. 4, in this embodiment of this application, the network device of the first type may be, for example, an eNB, and the network device of the second type may be, for example, a gNB. When the first indication information indicates that the network device accessed by the second terminal device is the network device of the first type, the type of the core network to which the network device accessed by the second terminal device is connected may be, for example, an EPC or a 5GC. This is uniformly described herein. Details are not described below again.

Optionally, in this embodiment of this application, that the first indication information indicates that the network device accessed by the second terminal device is the network device of the first type is equivalent to that the first indication information indicates that an RRC connection type of the second terminal device is the first type, and that the first indication information indicates that the network device accessed by the second terminal device is the network device of the second type is equivalent to that the first indication information indicates that an RRC connection type of the second terminal device is the second type. For example, with reference to the three scenarios shown in FIG. 4, assuming that the first indication information indicates that the network device accessed by the second terminal device is an eNB, this also means that the RRC connection type of the second terminal device is LTE; or assuming that the first indication information indicates that the network device accessed by the second terminal device is a gNB, this also means that the RRC connection type of the second terminal device is NR. In other words, with reference to the three scenarios shown in FIG. 4, assuming that the first indication information indicates that the RRC connection type of the second terminal device is LTE, this also means that the network device accessed by the second terminal device is the eNB; or assuming that the first indication information indicates that the RRC connection type of the second terminal device is NR, this also means that the network device accessed by the second terminal device is the gNB. This is uniformly described herein. Details are not described below again.

Optionally, when the first message in this embodiment of this application is the announcement message, in addition to carrying the first parameter, the announcement message in this embodiment of this application may further carry some existing parameters such as relay service code, a proximity-based services relay terminal identifier, or information about a message source terminal. The relay service code indicates a type of a public safety service. The proximity-based services relay terminal identifier is a distinct identifier allocated by the second terminal device to each type of relay service code. The information about the message source terminal is a user information identifier (User Info ID) allocated to the device according to a policy of a home public land mobile network (HPLMN) or a third-party public safety provider application server. For details, refer to an existing implementation. Details are not described herein.

S503: The first terminal device determines, based on the first identifier, that the first message is the discovery message.

In this embodiment of this application, because the first identifier is carried in the first SCI, and the first terminal device may parse the first SCI at the PHY layer after receiving the first SCI, the first terminal device may learn, at the PHY layer based on the first identifier in the first SCI, that the first message is the discovery message.

S504: The first terminal device determines, based on the first parameter, whether the second terminal device satisfies the capability requirement of the first terminal device.

Optionally, in this embodiment of this application, that the first terminal device determines, based on the first parameter, that the second terminal device satisfies the capability requirement of the first terminal device may include: The first terminal device determines, based on the identifier of the network that provides the service for the second terminal device, that the network that provides the service for the second terminal device is within connection permission of the first terminal device.

Further, when the first parameter further includes the network slice capability information of the second terminal device, that the first terminal device determines that the second terminal device satisfies the capability requirement of the first terminal device may further include: The first terminal device determines, based on the slice capability information of the second terminal device, that a slice capability of the second terminal device satisfies the slice capability requirement of the first terminal device.

Further, when the first parameter further includes the first indication information, that the first terminal device determines that the second terminal device satisfies the capability requirement of the first terminal device further includes: When a network device only to which the first terminal device supports establishment of a connection is the network device of the first type, the first terminal device determines, based on the first indication information, that the network device accessed by the second terminal device is the network device of the first type; when a network device only to which the first terminal device supports establishment of a connection is the network device of the second type, the first terminal device determines, based on the first indication information, that the network device accessed by the second terminal device is the network device of the second type; or when network devices to which the first terminal device supports establishment of connections are the network device of the first type and the network device of the second type, the first terminal device determines, based on the first indication information, that the network device accessed by the second terminal device is the network device of the first type or the network device of the second type.

Optionally, in this embodiment of this application, that the first terminal device determines, based on the first parameter, that the second terminal device does not satisfy the capability requirement of the first terminal device may include: The first terminal device determines, based on the identifier of the network that provides the service for the second terminal device, that the network that provides the service for the second terminal device is not within connection permission of the first terminal device.

Alternatively, when the first parameter further includes the network slice capability information of the second terminal device, that the first terminal device determines, based on the first parameter, that the second terminal device does not satisfy the capability requirement of the first terminal device may include: The first terminal device determines, based on the identifier of the network that provides the service for the second terminal device, that the network that provides the service for the second terminal device is within connection permission of the first terminal device, but the first terminal device determines, based on the slice capability information of the second terminal device, that a slice capability of the second terminal device does not satisfy the slice capability requirement of the first terminal device.

Alternatively, when the first parameter further includes the first indication information, that the first terminal device determines, based on the first parameter, that the second terminal device does not satisfy the capability requirement of the first terminal device may include: The first terminal device determines, based on the identifier of the network that provides the service for the second terminal device, that the network that provides the service for the second terminal device is within connection permission of the first terminal device, but when a network device only to which the first terminal device supports establishment of a connection is the network device of the first type, the first terminal device determines, based on the first indication information, that the network device accessed by the second terminal device is the network device of the second type; or when a network device only to which the first terminal device supports establishment of a connection is the network device of the second type, the first terminal device determines, based on the first indication information, that the network device accessed by the second terminal device is the network device of the first type.

It should be noted that, in steps S501 to S504 above, descriptions are provided by using an example in which one second terminal device interacts with the first terminal device. Certainly, a plurality of second terminal devices may interact with the first terminal device. For a procedure of interaction between any second terminal device and the first terminal device, refer to steps S501 to S504 above. Details are not described herein again.

Further, after the foregoing relay discovery is completed, the communication method provided in this embodiment of this application may further include a relay selection process shown in step S505.

S505: The first terminal device selects, according to a preset criterion, a target second terminal device from second terminal devices that satisfy the capability requirement of the first terminal device.

Optionally, in this embodiment of this application, the preset criterion may include a first preset criterion, and the first preset criterion is used to determine one or more second terminal devices with a high priority.

In a possible implementation, the one or more second terminal devices with the high priority are the foregoing target second terminal device.

In another possible implementation, the preset criterion may further include a second preset criterion, and the second preset criterion is used to select the target second terminal device from the one or more second terminal devices with the high priority.

Optionally, in this embodiment of this application, the first preset criterion may include one or more of the following:

A second terminal device that accesses a first network device has a high priority, where the first network device is a network device accessed by the first terminal device;

a second terminal device that accesses a network device connected to a core network whose type is a target core network type has a high priority;

a second terminal device whose resource pool channel busy degree is not greater than a first threshold has a high priority;

a second terminal device whose power measurement value is not less than a second threshold has a high priority; or when the network devices to which the first terminal device supports the establishment of the connections are the network device of the first type and the network device of the second type, a second terminal device that accesses a network device of a target type has a high priority, where the target type is a network device type determined by the first terminal device by default, or the target type is a network device type corresponding to a high-priority service of the first terminal device.

In this embodiment of this application, it is specified that the second terminal device that accesses the first network device has the high priority, so that a network device accessed by the selected target second terminal device is the same as the network device accessed by the first terminal device (where it is assumed that both are a network device 1). In this way, the first terminal device supports a dual connectivity scenario in which direct communication with the network device 1 and relay communication based on the second terminal device are established.

In this embodiment of this application, it is specified that the second terminal device that accesses the network device connected to the core network whose type is the target core network type has the high priority, so that a type of a core network to which the selected target second terminal device is connected is the target core network type. For example, service types of the 5GC are rich. For example, the 5GC can provide a network slice service. Therefore, the 5GC may be selected as the target core network type in this embodiment of this application.

In this embodiment of this application, it is specified that the second terminal device whose resource pool channel busy degree (where for example, the resource pool channel busy degree may be a channel busy ratio (CBR)) is not greater than the first threshold has the high priority, so that a resource pool channel busy degree corresponding to the selected target second terminal device is not greater than the first threshold. In other words, the resource pool busy degree corresponding to the selected target second terminal device is small. In this way, the first terminal device can be prevented from waiting for resource scheduling of the second terminal device for a long time.

In this embodiment of this application, it is specified that the second terminal device whose power measurement value (where for example, the power measurement value may be an SD-RSRP value) is not less than the second threshold has the high priority, so that a power measurement value corresponding to the selected target second terminal device is not less than the second threshold. In other words, the power measurement value corresponding to the selected target second terminal device is high, so that quality of a communication channel between the first terminal device and the second terminal device is high.

In this embodiment of this application, when the network devices to which the first terminal device supports the establishment of the connections are the network device of the first type and the network device of the second type, it is specified that the second terminal device that accesses the network device of the target type has the high priority, so that the selected target second terminal device is the second terminal device that accesses the network device of the target type. For example, when the target type is the network device type determined by the first terminal device by default: When the first terminal device uses an LTE service by default, the target second terminal device is a second terminal device connected to an eNB; or when the first terminal device uses an NR service by default, the target second terminal device is a second terminal device connected to a gNB. Alternatively, for example, when the target type is the network device type corresponding to the high-priority service of the first terminal device: When a priority of an LTE service of the first terminal device is higher than a priority of an NR service, the target second terminal device is a second terminal device connected to an eNB; or when a priority of an NR service of the first terminal device is higher than a priority of an LTE service, the target second terminal device is a second terminal device connected to a gNB.

Optionally, in this embodiment of this application, the second preset criterion may include:

The target second terminal device is a second terminal device corresponding to a lowest resource pool channel busy degree in the one or more second terminal devices with the high priority; or the target second terminal device is a second terminal device corresponding to a largest power measurement value in the one or more second terminal devices with the high priority.

When the target second terminal device is the second terminal device corresponding to the lowest resource pool channel busy degree in the one or more second terminal devices with the high priority, the target second terminal device further determined based on the second preset criterion may enable the first terminal device to establish a connection to the second terminal device having the lowest channel busy degree, so that the first terminal device can most efficiently obtain relay communication resource scheduling.

When the target second terminal device is the second terminal device corresponding to the largest power measurement value in the one or more second terminal devices with the high priority, the target second terminal device further determined based on the second preset criterion may enable the first terminal device to establish a connection to the second terminal device having optimal channel quality, so that relay communication channel quality of the first terminal device is optimal.

Certainly, optionally, in this embodiment of this application, it may be not necessary that the target second terminal device is selected from the one or more second terminal devices with the high priority based on the second preset criterion after screening is performed based on the first preset criterion. Instead, the preset criterion may include: The target second terminal device is a second terminal device corresponding to a lowest resource pool channel busy degree in the plurality of second terminal devices that satisfy the capability requirement of the first terminal device; or the target second terminal device is a second terminal device corresponding to a largest power measurement value in the plurality of second terminal devices that satisfy the capability requirement of the first terminal device. This is uniformly described herein. This is not specifically limited in this embodiment of this application.

In one aspect, a large delay may be caused in a process of implementing relay discovery by using existing PC5-U in a conventional technology. In this embodiment of this application, when sending the first message to the first terminal device, the second terminal device may also send the first SCI including the first identifier to the first terminal device, where the first identifier is used to indicate that the first message is the discovery message. Because the first identifier is carried in the first SCI, the first terminal device may parse the first SCI at the PHY layer after receiving the first SCI. Therefore, the first terminal device may learn, at the PHY layer based on the first identifier in the first SCI, that the first message is the discovery message, so that a case in which the large delay may be caused in the process of implementing the relay discovery by using existing PC5-U in the conventional technology is avoided. In another aspect, compared with a current public safety application scenario, a future relay communication application scenario including V2X additionally requires capability matching between a network device, the first terminal device, and the second terminal device. However, currently, in an NR relay communication scenario, there is no solution to a capability matching problem of the network device, the first terminal device, and the second terminal device. The first message in this embodiment of this application may carry the first parameter, and the first terminal device may determine, based on the first parameter, whether the second terminal device satisfies the capability requirement of the first terminal device, so that the capability matching problem of the network device, the first terminal device, and the second terminal device is resolved. In still another aspect, currently, in the NR relay communication scenario, there is no solution to a problem of how to select a most appropriate target second terminal device when the plurality of second terminal devices satisfy the capability requirement of the first terminal device. In this embodiment of this application, the first terminal device may select, according to the preset criterion, the target second terminal device from the second terminal devices that satisfy the capability requirement of the first terminal device, so that the problem of selecting the target second terminal device is resolved.

The actions of the first terminal device or the second terminal device in steps S501 to S505 above may be performed by the processor 301 in the communication apparatus 300 shown in FIG. 3 by invoking the application program code stored in the memory 303. This is not specifically limited in this embodiment of this application.

Figure 6:
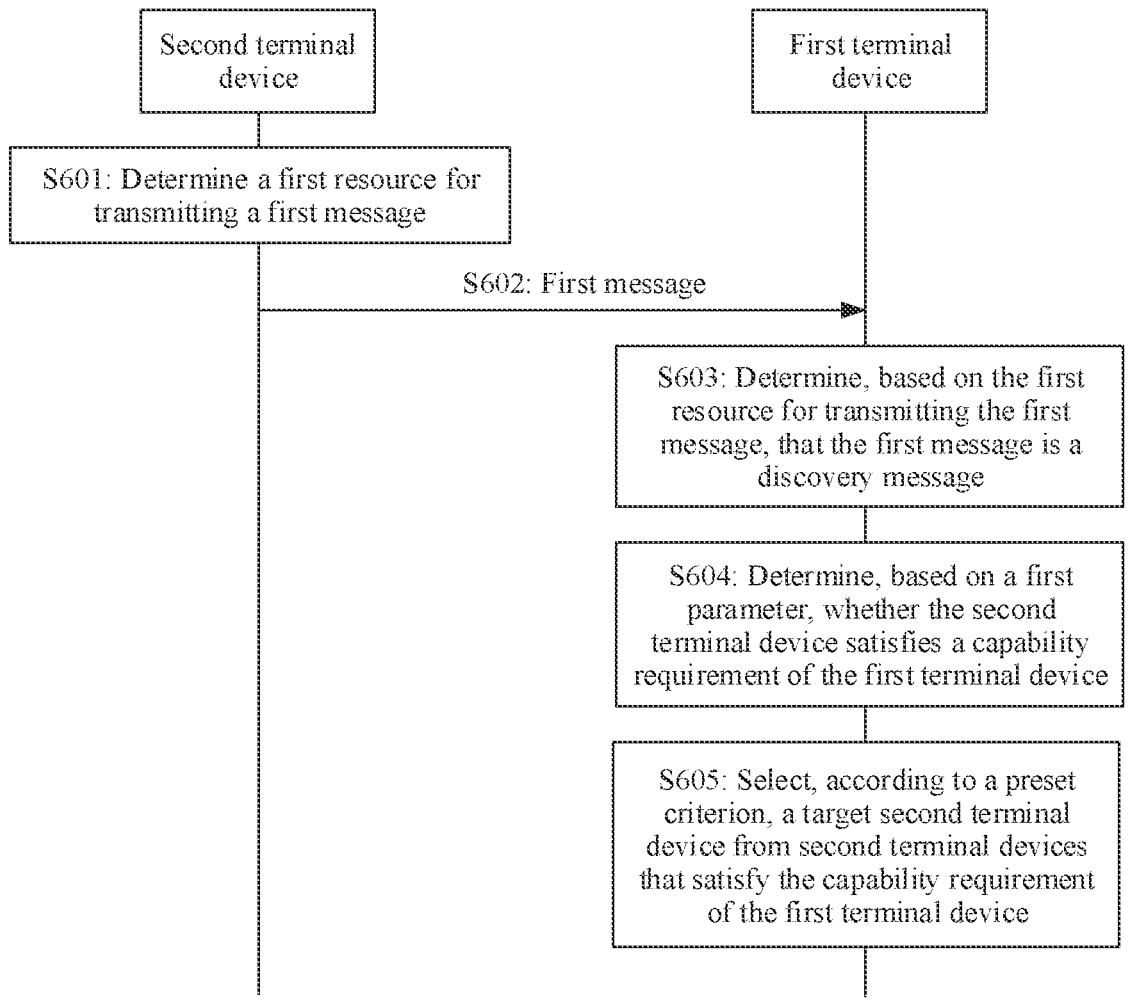
FIG. 6 is a schematic flowchart 2 of a communication method according to an embodiment of this application.

FIG. 6 shows another communication method according to an embodiment of this application. The method includes the following steps.

S601: A second terminal device determines a first resource for transmitting a first message, where the first resource is a resource specially used to transmit a discovery message, and the discovery message is used to indicate that the second terminal device is a relay terminal device.

S602: The second terminal device sends the first message to a first terminal device on the first resource, and correspondingly, the first terminal device receives the first message from the second terminal device on the first resource.

For example, the first message in this embodiment of this application may be an announcement message.

Optionally, in this embodiment of this application, the second terminal device may broadcast the first message in a broadcast manner, and the nearby first terminal device may receive the first message broadcast by the second terminal device.

Optionally, in this embodiment of this application, when broadcasting the first message, the second terminal device may further broadcast SCI simultaneously. For details, refer to an existing implementation. Details are not described herein.

Optionally, the first message in this embodiment of this application may include a first parameter. For related descriptions of the first parameter, refer to the embodiment shown in FIG. 5. Details are not described herein again.

Optionally, when the first message in this embodiment of this application is the announcement message, in addition to carrying the first parameter, the announcement message in this embodiment of this application may further carry some existing parameters. For related descriptions, refer to the embodiment shown in FIG. 5. Details are not described herein again.

S603: The first terminal device determines, based on the first resource for transmitting the first message, that the first message is the discovery message.

In this embodiment of this application, after receiving the first message, the first terminal device may learn, at a PHY layer, of the first resource for transmitting the first message. In addition, the first resource is the resource specially used to transmit a discovery message. Therefore, the first terminal device may learn, at the PHY layer based on the first resource, that the first message is the discovery message.

S604 and S605: Steps S604 and S605 are the same as steps S504 and S505 in the embodiment shown in FIG. 5. For related descriptions, refer to the embodiment shown in FIG. 5. Details are not described herein again.

In one aspect, a large delay may be caused in a process of implementing relay discovery by using existing PC5-U in a conventional technology. In this embodiment of this application, the second terminal device sends the first message to the first terminal device on the first resource. After receiving the first message, the first terminal device may learn, at the PHY layer, of the first resource for transmitting the first message. In addition, the first resource is the resource specially used to transmit a discovery message. Therefore, the first terminal device may learn, at the PHY layer based on the first resource, that the first message is the discovery message, so that a case in which the large delay may be caused in the process of implementing the relay discovery by using existing PC5-U in the conventional technology is avoided. In another aspect, compared with a current public safety application scenario, a future relay communication application scenario including V2X additionally requires capability matching between a network device, the first terminal device, and the second terminal device. However, currently, in an NR relay communication scenario, there is no solution to a capability matching problem of the network device, the first terminal device, and the second terminal device. The first message in this embodiment of this application may carry the first parameter, and the first terminal device may determine, based on the first parameter, whether the second terminal device satisfies the capability requirement of the first terminal device, so that the capability matching problem of the network device, the first terminal device, and the second terminal device is resolved. In still another aspect, currently, in the NR relay communication scenario, there is no solution to a problem of how to select a most appropriate target second terminal device when the plurality of second terminal devices satisfy the capability requirement of the first terminal device. In this embodiment of this application, the first terminal device may select, according to the preset criterion, the target second terminal device from the second terminal devices that satisfy the capability requirement of the first terminal device, so that the problem of selecting the target second terminal device is resolved.

The actions of the first terminal device or the second terminal device in steps S601 to S605 above may be performed by the processor 301 in the communication apparatus 300 shown in FIG. 3 by invoking the application program code stored in the memory 303. This is not specifically limited in this embodiment of this application.

Figure 7:
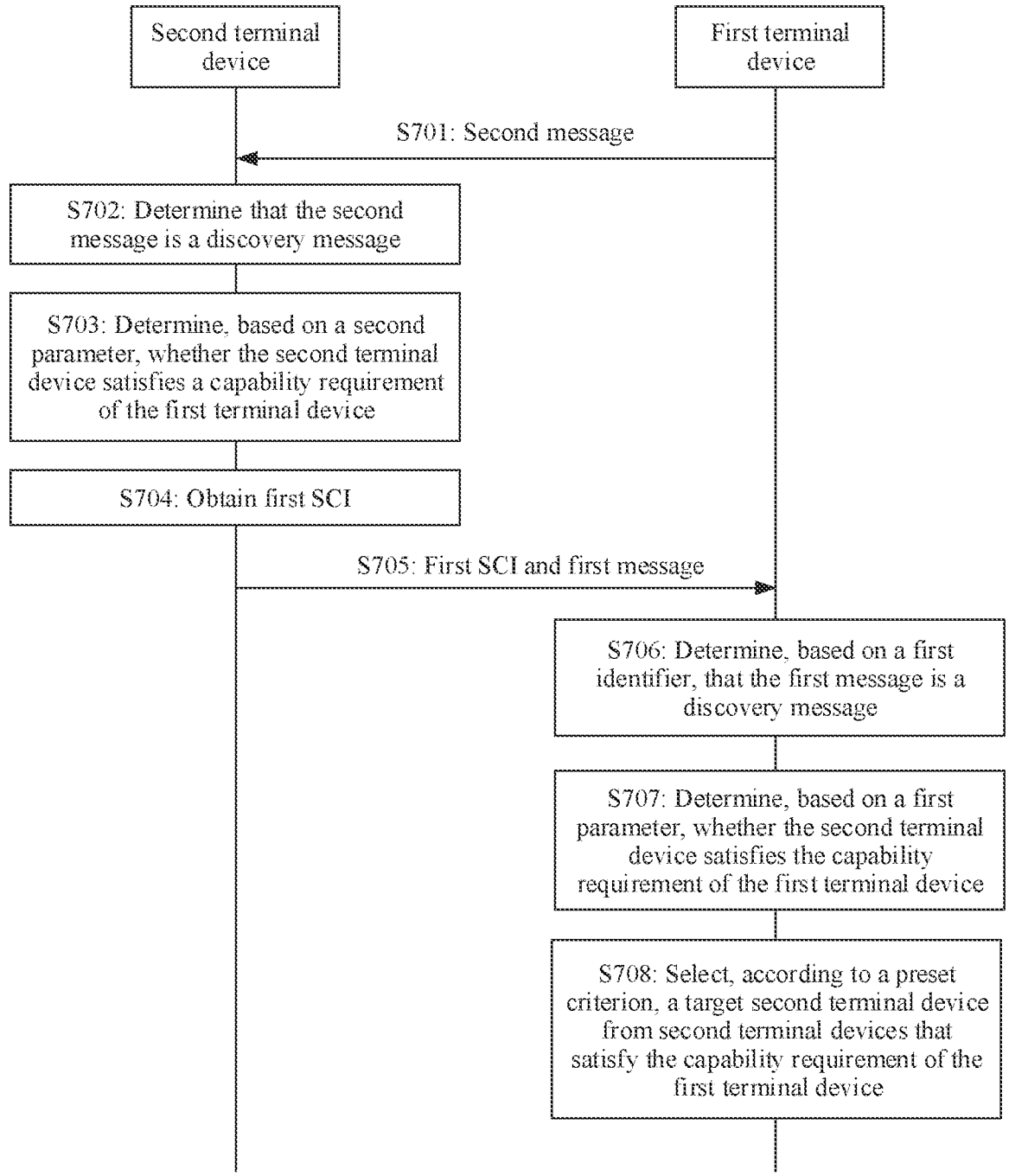
FIG. 7 is a schematic flowchart 3 of a communication method according to an embodiment of this application.

FIG. 7 shows another communication method according to an embodiment of this application. The method includes the following steps.

S701: A first terminal device sends a second message to a second terminal device, and correspondingly, the second terminal device receives the second message from the first terminal device, where the second message carries a second parameter, and the second parameter is used to determine whether the second terminal device satisfies a capability requirement of the first terminal device. For related descriptions of the capability requirement, refer to the embodiment shown in FIG. 5. Details are not described herein again.

For example, the second message in this embodiment of this application may be, for example, a solicitation message.

Optionally, in this embodiment of this application, the first terminal device may broadcast the second message to the known nearby second terminal device in a broadcast manner, and the nearby second terminal device may receive the second message broadcast by the first terminal device.

Optionally, in this embodiment of this application, when broadcasting the second message, the first terminal device may further broadcast SCI simultaneously. For details, refer to an existing implementation. Details are not described herein.

Optionally, the second parameter in this embodiment of this application may include an identifier list of networks that the first terminal device is permitted to access, and the identifier list of the networks that the first terminal device is permitted to access is used to determine whether the second terminal device satisfies a connection permission requirement of the first terminal device.

Optionally, the second parameter in this embodiment of this application may further include at least one of second indication information or a slice capability requirement of the first terminal device, and the second indication information indicates that network devices/a network device to which the first terminal device supports establishment of connections/a connection are/is a network device of a first type and/or a network device of a second type. The slice capability requirement of the first terminal device is used to determine whether the second terminal device satisfies the slice capability requirement of the first terminal device, and the second indication information is used to determine whether the second terminal device satisfies a type requirement of the network device to which the first terminal device supports the establishment of the connection.

Optionally, when the second message in this embodiment of this application is the solicitation message, in addition to carrying the second parameter, the solicitation message in this embodiment of this application may further carry some existing parameters such as relay service code, a proximity-based services relay terminal identifier, or information about a message source terminal. The relay service code indicates a type of a public safety service. The proximity-based services relay terminal identifier is a distinct identifier allocated by the second terminal device to each type of relay service code. The information about the message source terminal is a user information identifier (User Info ID) allocated to the device according to a policy of an HPLMN or a third-party public safety provider application server. For details, refer to an existing implementation. Details are not described herein.

Optionally, in a possible implementation, the communication method provided in this embodiment of this application further includes: The first terminal device sends second SCI to the second terminal device, where the second SCI includes a first identifier, and the first identifier is used to indicate that the second message is a discovery message.

Optionally, in another possible implementation, in this embodiment of this application, that a first terminal device sends a second message to a second terminal device includes: The first terminal device sends the second message to the second terminal device on a second resource, where the second resource is a resource specially used to transmit a discovery message.

S702: The second terminal device determines that the second message is the discovery message.

Optionally, in a possible implementation, when the first terminal device sends the second SCI to the second terminal device, the second terminal device receives the second SCI from the first terminal device. Further, that the second terminal device determines that the second message is the discovery message includes: The second terminal device determines, based on the first identifier in the second SCI, that the second message is the discovery message. The first identifier is carried in the second SCI, and the second terminal device may parse the second SCI at a PHY layer after receiving the second SCI. Therefore, the second terminal device may learn, at the PHY layer based on the first identifier in the second SCI, that the second message is the discovery message.

Optionally, in another possible implementation, when the first terminal device sends the second message to the second terminal device on the second resource, that the second terminal device determines that the second message is the discovery message includes: The second terminal device determines, based on the second resource for transmitting the second message, that the second message is the discovery message. After receiving the second message, the first terminal device may learn, at a PHY layer, of the second resource for transmitting the second message. In addition, the first resource is the resource specially used to transmit a discovery message. Therefore, the second terminal device may learn, at the PHY layer based on the second resource, that the second message is the discovery message.

This embodiment of this application provides, for example, the two implementations in which the second terminal device identifies, at the PHY layer, that the second message is the discovery message. Certainly, in this embodiment of this application, the second terminal device may alternatively identify, in an existing manner, that the second message is the discovery message. This is not specifically limited in this embodiment of this application.

S703: The second terminal device determines, based on the second parameter, whether the second terminal device satisfies the capability requirement of the first terminal device.

Optionally, in this embodiment of this application, that the second terminal device determines, based on the second parameter, that the second terminal device satisfies the capability requirement of the first terminal device may include: The second terminal device determines, based on the identifier list of the networks that the first terminal device is permitted to access, that a network that provides a service for the second terminal device is within connection permission of the first terminal device.

Further, when the second parameter further includes the slice capability requirement of the first terminal device, that the second terminal device determines that the second terminal device satisfies the capability requirement of the first terminal device may further include: The second terminal device determines, based on the slice capability requirement of the first terminal device, that a slice capability of the second terminal device satisfies the slice capability requirement of the first terminal device.

Further, when the second parameter further includes the second indication information, that the second terminal device determines that the second terminal device satisfies the capability requirement of the first terminal device may further include: When the second indication information indicates that the network device only to which the first terminal device supports the establishment of the connection is the network device of the first type, the second terminal device determines that a network device accessed by the second terminal device is the network device of the first type; when the second indication information indicates that the network device only to which the first terminal device supports the establishment of the connection is the network device of the second type, the second terminal device determines that a network device accessed by the second terminal device is the network device of the second type; or when the second indication information indicates that the network devices to which the first terminal device supports the establishment of the connections are the network device of the first type and the network device of the second type, the second terminal device determines that a network device accessed by the second terminal device is the network device of the first type or the network device of the second type.

Optionally, in this embodiment of this application, that the second terminal device determines, based on the second parameter, that the second terminal device does not satisfy the capability requirement of the first terminal device may include: The second terminal device determines, based on the identifier list of the networks that the first terminal device is permitted to access, that a network that provides a service for the second terminal device is not within connection permission of the first terminal device.

Alternatively, when the second parameter further includes the slice capability requirement of the first terminal device, that the second terminal device determines, based on the second parameter, that the second terminal device does not satisfy the capability requirement of the first terminal device may include: The second terminal device determines, based on the identifier list of the networks that the first terminal device is permitted to access, that a network that provides a service for the second terminal device is within connection permission of the first terminal device, but the second terminal device determines, based on the slice capability requirement of the first terminal device, that a slice capability of the second terminal device does not satisfy, the slice capability requirement of the first terminal device.

Alternatively, when the second parameter further includes the second indication information, that the second terminal device determines, based on the second parameter, that the second terminal device does not satisfy the capability requirement of the first terminal device may include: The second terminal device determines, based on the identifier list of the networks that the first terminal device is permitted to access, that a network that provides a service for the second terminal device is within connection permission of the first terminal device, but when the second indication information indicates that the network device only to which the first terminal device supports the establishment of the connection is the network device of the first type, the second terminal device determines that a network device accessed by the second terminal device is the network device of the second type; or when the second indication information indicates that the network device only to which the first terminal device supports the establishment of the connection is the network device of the second type, the second terminal device determines that a network device accessed by the second terminal device is the network device of the first type.

It should be noted that, in steps S701 to S703 above, descriptions are provided by using an example in which the first terminal device interacts with one second terminal device. Certainly, a plurality of second terminal devices may interact with the first terminal device. For a procedure of interaction between any second terminal device and the first terminal device, refer to steps S701 to S703 above. Details are not described herein again.

It is assumed that the second terminal device in the embodiment shown in FIG. 7 satisfies the capability requirement of the first terminal device. Further, the communication method provided in this embodiment of this application further includes the following steps.

S704: The second terminal device obtains first SCI, where the first SCI includes a first identifier, the first identifier is used to indicate that a first message is a discovery message, and the discovery message is used to indicate that the second terminal device is a relay terminal device.

S705: The second terminal device sends the first SCI and the first message to the first terminal device, and correspondingly, the first terminal device receives the first SCI and the first message from the second terminal device.

For example, the first message in this embodiment of this application may be a response message.

Optionally, the first message in this embodiment of this application may include a first parameter. For related descriptions of the first parameter, refer to the embodiment shown in FIG. 5. Details are not described herein again.

Optionally, when the first message in this embodiment of this application is the response message, in addition to carrying the first parameter, the response message in this embodiment of this application may further carry some existing parameters such as a proximity-based services relay terminal identifier and information about a message source terminal. For details, refer to an existing implementation. Details are not described herein.

S706 and S707: Steps S706 and S707 are the same as steps S503 and S504 in the embodiment shown in FIG. 5. For related descriptions, refer to the embodiment shown in FIG. 5. Details are not described herein again.

Further, after the relay discovery is completed, the communication method provided in this embodiment of this application may further include a relay selection process shown in step S708.

S708: Step S708 is the same as step S505 in the embodiment shown in FIG. 5. For related descriptions, refer to the embodiment shown in FIG. 5. Details are not described herein again.

In one aspect, a large delay may be caused in a process of implementing relay discovery by using existing PC5-U in a conventional technology. In this embodiment of this application, when sending the first message to the first terminal device, the second terminal device may also send the first SCI including the first identifier to the first terminal device, where the first identifier is used to indicate that the first message is the discovery message. Because the first identifier is carried in the first SCI, the first terminal device may parse the first SCI at the PHY layer after receiving the first SCI. Therefore, the first terminal device may learn, at the PHY layer based on the first identifier in the first SCI, that the first message is the discovery message, so that a case in which the large delay may be caused in the process of implementing the relay discovery by using existing PC5-U in the conventional technology is avoided. In another aspect, compared with a current public safety application scenario, a future relay communication application scenario including V2X additionally requires capability matching between a network device, the first terminal device, and the second terminal device. However, currently, in an NR relay communication scenario, there is no solution to a capability matching problem of the network device, the first terminal device, and the second terminal device. The first message in this embodiment of this application may carry the first parameter, and the first terminal device may determine, based on the first parameter, whether the second terminal device satisfies the capability requirement of the first terminal device, so that the capability matching problem of the network device, the first terminal device, and the second terminal device is resolved. In still another aspect, currently, in the NR relay communication scenario, there is no solution to a problem of how to select a most appropriate target second terminal device when the plurality of second terminal devices satisfy the capability requirement of the first terminal device. In this embodiment of this application, the first terminal device may select, according to the preset criterion, the target second terminal device from the second terminal devices that satisfy the capability requirement of the first terminal device, so that the problem of selecting the target second terminal device is resolved.

The actions of the first terminal device or the second terminal device in steps S701 to S708 above may be performed by the processor 301 in the communication apparatus 300 shown in FIG. 3 by invoking the application program code stored in the memory 303. This is not specifically limited in this embodiment of this application.

Figure 8:
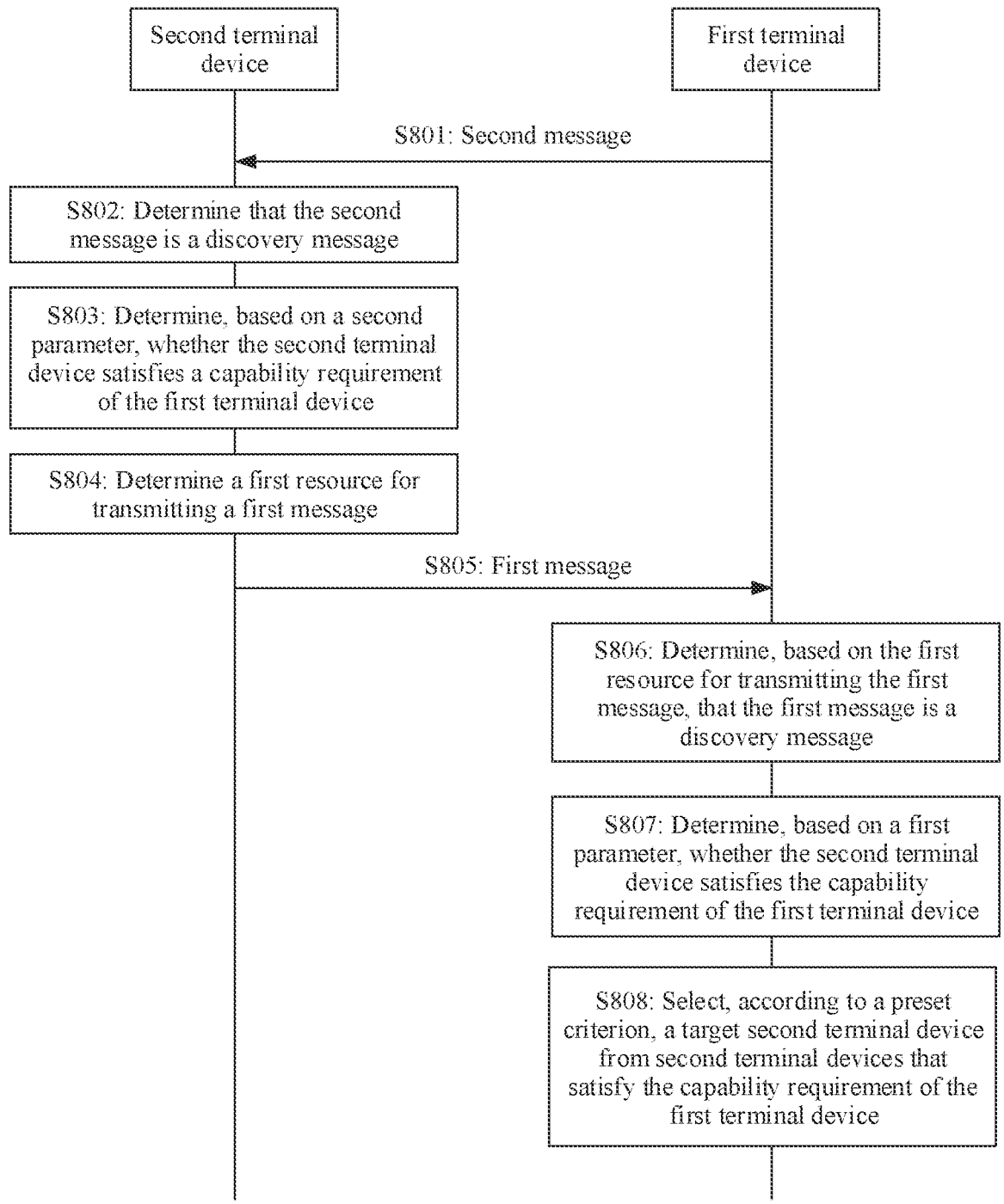
FIG. 8 is a schematic flowchart 4 of a communication method according to an embodiment of this application.

FIG. 8 shows another communication method according to an embodiment of this application. The method includes the following steps.

S801 to S803: Steps S801 to S803 are the same as steps S701 to S703 in the embodiment shown in FIG. 7. For related descriptions, refer to the embodiment shown in FIG. 7. Details are not described herein again.

S804: The second terminal device determines a first resource for transmitting a first message, where the first resource is a resource specially used to transmit a discovery message, and the discovery message is used to indicate that the second terminal device is a relay terminal device.

S805: The second terminal device sends the first message to the first terminal device on the first resource, and correspondingly, the first terminal device receives the first message from the second terminal device on the first resource.

For example, the first message in this embodiment of this application may be a response message.

Optionally, the first message in this embodiment of this application may include a first parameter. For related descriptions of the first parameter, refer to the embodiment shown in FIG. 5. Details are not described herein again.

Optionally, when the first message in this embodiment of this application is the response message, in addition to carrying the first parameter, the response message in this embodiment of this application may further carry some existing parameters such as a proximity-based services relay terminal identifier and information about a message source terminal. For details, refer to an existing implementation. Details are not described herein.

Optionally, in this embodiment of this application, when sending the first message to the first terminal device, the second terminal device may further send SCI simultaneously. For details, refer to an existing implementation. Details are not described herein.

S806 and S807: Steps S806 and S807 are the same as steps S603 and S604 in the embodiment shown in FIG. 6. For related descriptions, refer to the embodiment shown in FIG. 6. Details are not described herein again.

Further, after the relay discovery is completed, the communication method provided in this embodiment of this application may further include a relay selection process shown in step S808.

S808: Step S808 is the same as step S505 in the embodiment shown in FIG. 5. For related descriptions, refer to the embodiment shown in FIG. 5. Details are not described herein again.

In one aspect, a large delay may be caused in a process of implementing relay discovery by using existing PC5-U in a conventional technology. In this embodiment of this application, the second terminal device sends the first message to the first terminal device on the first resource. After receiving the first message, the first terminal device may learn, at a PHY layer, of the first resource for transmitting the first message. In addition, the first resource is the resource specially used to transmit a discovery message. Therefore, the first terminal device may learn, at the PHY layer based on the first resource, that the first message is the discovery message, so that a case in which the large delay may be caused in the process of implementing the relay discovery by using existing PC5-U in the conventional technology is avoided. In another aspect, compared with a current public safety application scenario, a future relay communication application scenario including V2X additionally requires capability matching between a network device, the first terminal device, and the second terminal device. However, currently, in an NR relay communication scenario, there is no solution to a capability matching problem of the network device, the first terminal device, and the second terminal device. The first message in this embodiment of this application may carry the first parameter, and the first terminal device may determine, based on the first parameter, whether the second terminal device satisfies the capability requirement of the first terminal device, so that the capability matching problem of the network device, the first terminal device, and the second terminal device is resolved. In still another aspect, currently, in the NR relay communication scenario, there is no solution to a problem of how to select a most appropriate target second terminal device when the plurality of second terminal devices satisfy the capability requirement of the first terminal device. In this embodiment of this application, the first terminal device may select, according to the preset criterion, the target second terminal device from the second terminal devices that satisfy the capability requirement of the first terminal device, so that the problem of selecting the target second terminal device is resolved.

The actions of the first terminal device or the second terminal device in steps S801 to S808 above may be performed by the processor 301 in the communication apparatus 300 shown in FIG. 3 by invoking the application program code stored in the memory 303. This is not specifically limited in this embodiment of this application.

It should be noted that in any one of the embodiments shown in FIG. 5 to FIG. 8, the capability matching problem of the network device, the first terminal device, and the second terminal device in the NR relay communication scenario, the problem of selecting the target second terminal device in the NR relay communication scenario, and the problem that the large delay may be caused in the process of implementing the relay discovery by using existing PC5-U in the conventional technology are all resolved. However, for the foregoing three technical problems, the solutions provided in embodiments of this application may be decoupled from each other. In other words, any one of the foregoing three problems may be resolved by using the technical solutions provided in embodiments of this application, and the other two of the foregoing three problems may be resolved by using a technical solution other than the technical solutions provided in embodiments of this application. Alternatively, two of the foregoing three problems may be resolved by using the technical solutions provided in embodiments of this application, and the other one of the foregoing three problems may be resolved by using a technical solution other than the technical solutions provided in embodiments of this application. This is not specifically limited in embodiments of this application.

Optionally, in embodiments of this application, in addition to the discovery message identification methods provided in the embodiments shown in FIG. 5 to FIG. 8, an embodiment of this application further provides a discovery message identification method. The method specifically includes, allocating a default destination identifier (Destination ID) to a discovery message, where the default destination ID is used to indicate that a corresponding message (for example, the foregoing first message or second message) is the discovery message. Because the destination ID is encapsulated at a MAC layer, after receiving the first message, a first terminal device may identify, at the MAC layer based on the destination ID, that the first message is the discovery message; or after receiving the second message, a second terminal device may identify, at the MAC layer based on the destination ID, that the second message is the discovery message. This is not specifically limited in this embodiment of this application.

Optionally, in embodiments of this application, in addition to the discovery message identification methods provided in the embodiments shown in FIG. 5 to FIG. 8, an embodiment of this application further provides a discovery message identification method. The method specifically includes: providing a dedicated logical channel for a discovery message, where the logical channel is used to indicate that a corresponding message (for example, the foregoing first message or second message) is the discovery message. Because the logical channel is parsed at a MAC layer, after receiving the first message, a first terminal device may identify, at the MAC layer based on the dedicated logical channel, that the first message is the discovery message; or after receiving the second message, a second terminal device may identify, at the MAC layer based on the dedicated logical channel, that the second message is the discovery message. This is not specifically limited in this embodiment of this application.

It may be understood that, in the foregoing embodiments, the method and/or step implemented by the first terminal device may alternatively be implemented by a component (for example, a chip or a circuit) that can be used in the first terminal device, and the method and/or step implemented by the second terminal device may alternatively be implemented by a component (for example, a chip or a circuit) that can be used in the second terminal device.

The foregoing mainly describes the solutions provided in embodiments of this application from a perspective of interaction between the network elements. Correspondingly, an embodiment of this application further provides a communication apparatus, and the communication apparatus is configured to implement the foregoing methods. The communication apparatus may be the first terminal device in the foregoing method embodiments, an apparatus including the foregoing first terminal device, or a component that can be used in the first terminal device. Alternatively, the communication apparatus may be the second terminal device in the foregoing method embodiments, an apparatus including the foregoing second terminal device, or a component that can be used in the second terminal device. It may be understood that, to implement the foregoing functions, the communication apparatus includes a corresponding hardware structure and/or software module for executing the functions. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the functions of each particular application, but it should not be considered that the implementation goes beyond the scope of this application.

In embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that, in embodiments of this application, division into the modules is an example, and is merely logical function division. Another division manner may be used during actual implementation.

Figure 9:
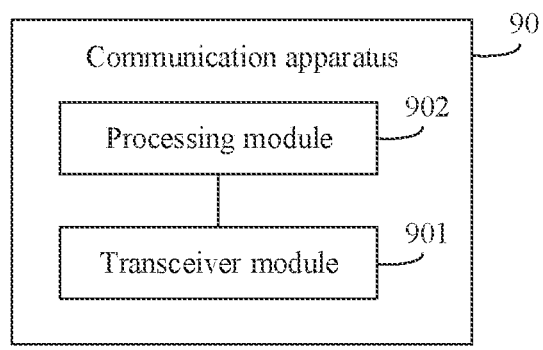
FIG. 9 is a schematic diagram 2 of a structure of a communication apparatus according to an embodiment of this application.

FIG. 9 is a schematic diagram of a structure of a communication apparatus 90. The communication apparatus 90 includes a transceiver module 901 and a processing module 902. The transceiver module 901 may also be referred to as a transceiver unit, and is configured to implement a transceiver function. For example, the transceiver module 901 may be a transceiver circuit, a transceiver, a transceiver, or a communication interface.

For example, the communication apparatus 90 is the first terminal device in the foregoing method embodiments. In a possible implementation:

The transceiver module 901 is configured to receive first SCI and a first message from a second terminal device, where the first SCI includes a first identifier, the first identifier is used to indicate that the first message is a discovery message, and the discovery message is used to indicate that the second terminal device is a relay terminal device. The processing module 902 is configured to determine, based on the first identifier, that the first message is the discovery message.

In another possible implementation:

The transceiver module 901 is configured to receive a first message from a second terminal device. The processing module 902 is configured to determine, based on a first resource for transmitting the first message, that the first message is a discovery message, where the first resource is a resource specially used to transmit a discovery message, and the discovery message is used to indicate that the second terminal device is a relay terminal device.

Optionally, the first message includes a first parameter. The processing module 902 is further configured to determine, based on the first parameter, that the second terminal device satisfies a capability requirement of the first terminal device or that the second terminal device does not satisfy a capability requirement of the first terminal device.

Optionally, the first parameter includes an identifier of a network that provides a service for the second terminal device. Correspondingly, that the processing module 902 is configured to determine, based on the first parameter, that the second terminal device satisfies a capability requirement of the first terminal device includes: The processing module 902 is configured to determine, based on the identifier of the network that provides the service for the second terminal device, that the network that provides the service for the second terminal device is within connection permission of the first terminal device.

Optionally, the first parameter further includes network slice capability information of the second terminal device. That the processing module 902 is configured to determine that the second terminal device satisfies a capability requirement of the first terminal device further includes: The processing module 902 is further configured to determine, based on the slice capability information of the second terminal device, that a slice capability of the second terminal device satisfies a slice capability requirement of the first terminal device.

Optionally, the first parameter further includes first indication information, and the first indication information indicates that a network device accessed by the second terminal device is a network device of a first type or a network device of a second type. That the processing module 902 is configured to determine that the second terminal device satisfies a capability requirement of the first terminal device further includes: The processing module 902 is configured to: when a network device only to which the first terminal device supports establishment of a connection is the network device of the first type, determine, based on the first indication information, whether the network device accessed by the second terminal device is the network device of the first type; the processing module 902 is configured to: when a network device only to which the first terminal device supports establishment of a connection is the network device of the second type, determine, based on the first indication information, that the network device accessed by the second terminal device is the network device of the second type; or the processing module 902 is configured to: when network devices to which the first terminal device supports establishment of connections are the network device of the first type and the network device of the second type, determine, based on the first indication information, that the network device accessed by the second terminal device is the network device of the first type or the network device of the second type.

Optionally, the transceiver module 901 is further configured to send a second message to the second terminal device, where the second message carries a second parameter, and the second parameter is used to determine that the second terminal device satisfies the capability requirement of the first terminal device.

Optionally, that the transceiver module 901 is configured to send a second message to the second terminal device includes: The transceiver module 901 is configured to send the second message to the second terminal device on a second resource, where the second resource is a resource specially used to transmit a discovery message.

Optionally, the transceiver module 901 is further configured to send second SCI to the second terminal device, where the second SCI includes a first identifier, and the first identifier is used to indicate that the second message is a discovery message.

Optionally, the processing module 902 is further configured to select, according to a preset criterion, a target second terminal device from a plurality of second terminal devices that satisfy the capability requirement of the first terminal device.

In still another possible implementation:

The transceiver module 901 is configured to receive a first message from a second terminal device, where the first message includes a first parameter. The processing module 902 is configured to determine, based on the first parameter, that the second terminal device satisfies a capability requirement of the first terminal device or that the second terminal device does not satisfy a capability requirement of the first terminal device.

For example, the communication apparatus 90 is the second terminal device in the foregoing method embodiments. In a possible implementation:

The processing module 902 is configured to obtain first SCI, where the first SCI includes a first identifier, the first identifier is used to indicate that a first message is a discovery message, and the discovery message is used to indicate that the second terminal device is a relay terminal device. The transceiver module 901 is configured to send the first SCI and the first message to a first terminal device.

In another possible implementation:

The processing module 902 is configured to determine a first resource, where the first resource is a resource specially used to transmit a discovery message, and the discovery message is used to indicate that the second terminal device is a relay terminal device. The transceiver module 901 is configured to send a first message to a first terminal device on the first resource.

Optionally, the transceiver module 901 is further configured to receive a second message from the first terminal device, where the second message carries a second parameter. The processing module 902 is further configured to determine that the second message is a discovery message. The processing module 902 is further configured to determine, based on the second parameter, that the second terminal device satisfies a capability requirement of the first terminal device.

Optionally, the transceiver module 901 is configured to receive second SCI from the first terminal device, where the second SCI includes a first identifier, and the first identifier is used to indicate that the second message is the discovery message. The processing module 902 is further configured to determine, based on the first identifier, that the second message is the discovery message.

Optionally, the processing module 902 is further configured to determine, based on a second resource for transmitting the second message, that the second message is the discovery message, where the second resource is a resource specially used to transmit a discovery message.

Optionally, the second parameter includes an identifier list of networks that the first terminal device is permitted to access. Correspondingly, that the processing module 902 is configured to determine, based on the second parameter, that the second terminal device satisfies a capability requirement of the first terminal device includes: The processing module 902 is configured to determine, based on the identifier list of the networks that the first terminal device is permitted to access, that the network that provides the service for the second terminal device is within connection permission of the first terminal device.

Optionally, the second parameter further includes a slice capability requirement of the first terminal device. That the processing module 902 is configured to determine that the second terminal device satisfies a capability requirement of the first terminal device further includes: The processing module 902 is configured to determine, based on the slice capability requirement of the first terminal device, that a slice capability of the second terminal device satisfies the slice capability requirement of the first terminal device.

Optionally, the second parameter further includes second indication information, and the second indication information indicates that network devices/a network device to which the first terminal device supports establishment of connections/a connection are/is a network device of a first type and/or a network device of a second type. That the processing module 902 is configured to determine that the second terminal device satisfies a capability requirement of the first terminal device further includes: The processing module 902 is configured to: when the second indication information indicates that the network device only to which the first terminal device supports the establishment of the connection is the network device of the first type, determine that a network device accessed by the second terminal device is the network device of the first type; the processing module 902 is configured to: when the second indication information indicates that the network device only to which the first terminal device supports the establishment of the connection is the network device of the second type, determine that a network device accessed by the second terminal device is the network device of the second type: or the processing module 902 is configured to: when the second indication information indicates that the network devices to which the first terminal device supports the establishment of the connections are the network device of the first type and the network device of the second type, determine that a network device accessed by the second terminal device is the network device of the first type or the network device of the second type.

In still another possible implementation:

The processing module 902 is configured to determine a first parameter. The transceiver module 901 is configured to send a first message to a first terminal device, where the first message includes the first parameter, and the first parameter is used to determine that the second terminal device satisfies a capability requirement of the first terminal device or that the second terminal device does not satisfy a capability requirement of the first terminal device.

All related content of the steps in the foregoing method embodiments may be cited in function descriptions of the corresponding function modules. Details are not described herein again.

In this embodiment, the communication apparatus 90 is presented in a form of function modules obtained through division in an integrated manner. The "module" herein may be a specified ASIC, a circuit, a processor and a memory that execute one or more software or firmware programs, an integrated logic circuit, and/or another component that can provide the foregoing functions. In a simple embodiment, a person skilled in the art may figure out that the communication apparatus 90 may be in the form of the communication apparatus 300 shown in FIG. 3.

For example, the processor 301 in the communication apparatus 300 shown in FIG. 3 may invoke the computer-executable instructions stored in the memory 303, to enable the communication apparatus 300 to perform the communication methods in the foregoing method embodiments.

Specifically, functions/implementation processes of the transceiver module 901 and the processing module 902 in FIG. 9 may be implemented by the processor 301 in the communication apparatus 300 shown in FIG. 3 by invoking the computer-executable instructions stored in the memory 303. Alternatively, a function/an implementation process of the processing module 902 in FIG. 9 may be implemented by the processor 301 in the communication apparatus 300 shown in FIG. 3 by invoking the computer-executable instructions stored in the memory 303, and a function/an implementation process of the transceiver module 901 in FIG. 9 may be implemented through the communication interface 304 in the communication apparatus 300 shown in FIG. 3.

The communication apparatus 90 provided in this embodiment may perform the communication methods in the foregoing method embodiments. Therefore, for technical effects that can be obtained by the communication apparatus 90, refer to the foregoing method embodiments. Details are not described herein again.

Figure 10:
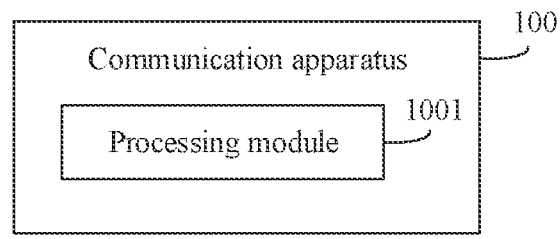
FIG. 10 is a schematic diagram 3 of a structure of a communication apparatus according to an embodiment of this application.

Optionally, FIG. 10 is a schematic diagram of a structure of a communication apparatus 100. The communication apparatus 100 includes a processing module 1001. The processing module 1001 is configured to determine a plurality of second terminal devices that satisfy a capability requirement of a first terminal device, and select, according to a preset criterion, a target second terminal device from the plurality of second terminal devices that satisfy the capability requirement of the first terminal device.

All related content of the steps in the foregoing method embodiments may be cited in function descriptions of the corresponding function modules. Details are not described herein again.

In this embodiment, the communication apparatus 100 is presented in a form of function modules obtained through division in an integrated manner. The "module" herein may be a specified ASIC, a circuit, a processor and a memory that execute one or more software or firmware programs, an integrated logic circuit, and/or another component that can provide the foregoing functions. In a simple embodiment, a person skilled in the art may figure out that the communication apparatus 100 may be in the form of the communication apparatus 300 shown in FIG. 3.

For example, the processor 301 in the communication apparatus 300 shown in FIG. 3 may invoke the computer-executable instructions stored in the memory 303, to enable the communication apparatus 300 to perform the communication methods in the foregoing method embodiments.

Specifically, functions/implementation processes of the processing module 1001 in FIG. 10 may be implemented by the processor 301 in the communication apparatus 300 shown in FIG. 3 by invoking the computer-executable instructions stored in the memory 303.

The communication apparatus 100 provided in this embodiment may perform the communication methods in the foregoing method embodiments. Therefore, for technical effects that can be obtained by the communication apparatus 100, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into an SoC (system-on-a-chip) or an ASIC, or may be an independent semiconductor chip. The processor includes a core for executing software instructions to perform operations or processing, and may further include a necessary hardware accelerator, for example, a field programmable gate array (FPGA), a PLD (programmable logic device), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (where for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to indicate the communication apparatus to perform the method in any one of the foregoing method embodiments. Certainly, the memory may alternatively not be located in the communication apparatus. When the communication apparatus is a chip system, the communication apparatus may include a chip, or may include the chip and another discrete component. This is not specifically limited in this embodiment of this application.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments herein, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that the measures cannot be combined to produce a good effect.

Although this application is described with reference to specific features and embodiments thereof, it is clear that various modifications and combinations may be made to them without departing from the spirit and the scope of this application. Correspondingly, the specification and accompanying drawings are merely example description of this application defined by the appended claims, and are considered as any of and all modifications, variations, combinations, or equivalents that cover the scope of this application. It is clear that a person skilled in the art can make various modifications and variations to this application without departing from the spirit and the scope of this application. This application is intended to cover these modifications and variations of this application provided that they fall within the scope of the claims of this application and their equivalent technologies.

What is claimed is:

1. A communication method, wherein the method comprises:
   receiving, by a first terminal device, a first message from a second terminal device;
   determining, by the first terminal device, a first logical channel corresponding to the first message, wherein the first logical channel comprises a dedicated logical channel, wherein the first message comprises a first parameter, and the first parameter comprises network slice capability information of the second terminal device;
   determining, by the first terminal device based on the first logical channel, that the first message is a discovery message, wherein the discovery message indicates that the second terminal device is a relay terminal device; and
   determining, by the first terminal device based on the network slice capability information of the second terminal device, that a slice capability of the second terminal device satisfies a slice capability requirement of the first terminal device.

2. The method according to claim 1, wherein the first parameter comprises an identifier of a network that provides a service for the second terminal device; and wherein the method comprises:
   the determining, by the first terminal device based on the first parameter, that the second terminal device satisfies a capability requirement of the first terminal device comprises:
   determining, by the first terminal device based on the identifier of the network that provides the service for the second terminal device, that the network that provides the service for the second terminal device is within connection permission of the first terminal device.

3. The method according to claim 2, wherein the first parameter further comprises first indication information, and the first indication information indicates that a network device accessed by the second terminal device is a network device of a first type or a network device of a second type; and wherein the method comprises:
   when a network device to which the first terminal device supports establishment of a connection is the network device of the first type and is not the network device of the second type, determining, by the first terminal device based on the first indication information, that the network device accessed by the second terminal device is the network device of the first type;
   when the network device to which the first terminal device supports establishment of a connection is the network device of the second type and is not the network device of the first type, determining, by the first terminal device based on the first indication information, that the network device accessed by the second terminal device is the network device of the second type; or
   when network devices to which the first terminal device supports establishment of connections are the network device of the first type and the network device of the second type, determining, by the first terminal device based on the first indication information, that the network device accessed by the second terminal device is the network device of the first type or the network device of the second type.

4. The method according to claim 3, wherein when the first indication information indicates that the network device accessed by the second terminal device is the network device of the first type, the first parameter further comprises a type of a core network to which the network device accessed by the second terminal device is connected.

5. The method according to claim 1, wherein the method further comprises:
   sending, by the first terminal device, a second message to the second terminal device, wherein the second message carries a second parameter, and the second parameter is used to determine that the second terminal device satisfies a capability requirement of the first terminal device.

6. An apparatus, comprising:
   at least one processor and a memory storing instructions for execution by the at least one processor;
   wherein, when executed, the instructions cause the apparatus to perform operations comprising:
   receiving, by a first terminal device, a first message from a second terminal device;
   determining, by the first terminal device, a first logical channel corresponding to the first message, wherein the first logical channel comprises a dedicated logical channel, wherein the first message comprises a first parameter, and the first parameter comprises network slice capability information of the second terminal device;
   determining, based on the first logical channel, that the first message is a discovery message, wherein the discovery message indicates that the second terminal device is a relay terminal device; and
   determining, based on the network slice capability information of the second terminal device, that a slice capability of the second terminal device satisfies a slice capability requirement of the first terminal device.

7. The apparatus according to claim 6, wherein the first parameter comprises an identifier of a network that provides a service for the second terminal device; and
wherein the operations further comprise:
   determining, based on the identifier of the network that provides the service for the second terminal device, that the network that provides the service for the second terminal device is within connection permission of the first terminal device.

8. The apparatus according to claim 7, wherein the first parameter further comprises first indication information, and the first indication information indicates that a network device accessed by the second terminal device is a network device of a first type or a network device of a second type; and wherein the operations further comprise:
when a network device to which the first terminal device supports establishment of a connection is the network device of the first type and is not the network device of the second type, determining, by the first terminal device based on the first indication information, that the network device accessed by the second terminal device is the network device of the first type;
when the network device to which the first terminal device supports establishment of a connection is the network device of the second type and is not the network device of the first type, determining, by the first terminal device based on the first indication information, that the network device accessed by the second terminal device is the network device of the second type; or
when network devices to which the first terminal device supports establishment of connections are the network device of the first type and the network device of the second type, determining, by the first terminal device based on the first indication information, that the network device accessed by the second terminal device is the network device of the first type or the network device of the second type.

9. The apparatus according to claim 8, wherein when the first indication information indicates that the network device accessed by the second terminal device is the network device of the first type, the first parameter further comprises a type of a core network to which the network device accessed by the second terminal device is connected.

10. The apparatus according to claim 6, wherein the operations further comprise:
sending a second message to the second terminal device, wherein the second message carries a second parameter, and the second parameter is used to determine that the second terminal device satisfies a capability requirement of the first terminal device.

11. One or more non-transitory computer-readable media storing computer instructions, that when executed by one or more processors, cause a computing device to perform operations comprising:
receiving a first message from a second terminal device;
determining a first logical channel corresponding to the first message, wherein the first logical channel comprises a dedicated logical channel, wherein the first message comprises a first parameter, and the first parameter comprises network slice capability information of the second terminal device;
determining, based on the first logical channel, that the first message is a discovery message, wherein the discovery message indicates that the second terminal device is a relay terminal device; and
determining, based on the network slice capability information of the second terminal device, that a slice capability of the second terminal device satisfies a slice capability requirement of a first terminal device.

12. The one or more non-transitory computer-readable media according to claim 11, wherein the first parameter comprises an identifier of a network that provides a service for the second terminal device; and wherein the operations comprise:
determining, by the first terminal device based on the identifier of the network that provides the service for the second terminal device, that the network that provides the service for the second terminal device is within connection permission of the first terminal device.

13. The one or more non-transitory computer-readable media according to claim 12, wherein the first parameter further comprises first indication information, and the first indication information indicates that a network device accessed by the second terminal device is a network device of a first type or a network device of a second type; and wherein the operations comprise:
when a network device to which the first terminal device supports establishment of a connection is the network device of the first type and is not the network device of the second type, determining, based on the first indication information, that the network device accessed by the second terminal device is the network device of the first type;
when the network device to which the first terminal device supports establishment of a connection is the network device of the second type and is not the network device of the first type, determining, based on the first indication information, that the network device accessed by the second terminal device is the network device of the second type; or
when network devices to which the first terminal device supports establishment of connections are the network device of the first type and the network device of the second type, determining, based on the first indication information, that the network device accessed by the second terminal device is the network device of the first type or the network device of the second type.

14. The one or more non-transitory computer-readable media according to claim 13, wherein when the first indication information indicates that the network device accessed by the second terminal device is the network device of the first type, the first parameter further comprises a type of a core network to which the network device accessed by the second terminal device is connected.

15. The one or more non-transitory computer-readable media according to claim 11, wherein the operations comprise:
sending a second message to the second terminal device, wherein the second message carries a second parameter, and the second parameter is used to determine that the second terminal device satisfies a capability requirement of the first terminal device.

* * * * *